United States Patent
Li et al.

(10) Patent No.: US 12,277,927 B2
(45) Date of Patent: Apr. 15, 2025

(54) END-TO-END STREAMING SPEECH TRANSLATION WITH NEURAL TRANSDUCER

(71) Applicant: MICROSOFT TECHNOLOGY LICENSING, LLC, Redmond, WA (US)

(72) Inventors: Jinyu Li, Bellevue, WA (US); Jian Xue, Bellevue, WA (US); Matthew John Post, Baltimore, MD (US); Peidong Wang, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 346 days.

(21) Appl. No.: 17/695,218

(22) Filed: Mar. 15, 2022

(65) Prior Publication Data

US 2023/0298566 A1  Sep. 21, 2023

(51) Int. Cl.
 *G06F 40/284* (2020.01)
 *G06F 40/58* (2020.01)
 (Continued)

(52) U.S. Cl.
 CPC .......... *G10L 15/063* (2013.01); *G06F 40/284* (2020.01); *G06F 40/58* (2020.01);
 (Continued)

(58) Field of Classification Search
 CPC ..... G10L 15/005; G10L 15/15; G10L 15/197; G10L 15/22; G06F 40/58
 See application file for complete search history.

(56) References Cited

U.S. PATENT DOCUMENTS

| 9,892,733 B2* | 2/2018 | Yassa ...................... G10L 15/26 |
| 2015/0051897 A1* | 2/2015 | Waibel .................... G06F 40/44 704/2 |

(Continued)

FOREIGN PATENT DOCUMENTS

| CN | 108874788 A | 11/2018 | |
| CN | 111326157 A * | 6/2020 | ............. G06N 3/045 |

(Continued)

OTHER PUBLICATIONS

Battenberg, Eric, et al. "Exploring neural transducers for end-to-end speech recognition." 2017 IEEE automatic speech recognition and understanding workshop (ASRU). IEEE, 2017. (Year: 2017).*

(Continued)

*Primary Examiner* — Paras D Shah
*Assistant Examiner* — Oluwadamilola M Ogunbiyi
(74) *Attorney, Agent, or Firm* — Workman Nydegger

(57) ABSTRACT

Systems and methods are provided for obtaining, training, and using an end-to-end AST model based on a neural transducer, the end-to-end AST model comprising at least (i) an acoustic encoder which is configured to receive and encode audio data, (ii) a prediction network which is integrated in a parallel model architecture with the acoustic encoder in the end-to-end AST model, and (iii) a joint layer which is integrated in series with the acoustic encoder and prediction network. The end-to-end AST model is configured to generate a transcription in the second language of input audio data in the first language such that the acoustic encoder learns a plurality of temporal processing paths.

20 Claims, 16 Drawing Sheets

(51) Int. Cl.
*G10L 15/00* (2013.01)
*G10L 15/06* (2013.01)
*G10L 15/16* (2006.01)
*G10L 15/197* (2013.01)
*G10L 15/22* (2006.01)

(52) U.S. Cl.
CPC ............ *G10L 15/005* (2013.01); *G10L 15/16* (2013.01); *G10L 15/197* (2013.01); *G10L 15/22* (2013.01)

(56) References Cited

U.S. PATENT DOCUMENTS

| | | | |
|---|---|---|---|
| 2015/0347399 A1* | 12/2015 | Aue | H04M 3/42 704/2 |
| 2016/0147740 A1* | 5/2016 | Gao | G10L 15/063 704/2 |
| 2019/0172444 A1* | 6/2019 | Hiroe | G10L 15/10 |
| 2019/0244623 A1* | 8/2019 | Hall | G06T 13/40 |
| 2019/0354592 A1* | 11/2019 | Musham | G10L 13/00 |
| 2020/0027444 A1* | 1/2020 | Prabhavalkar | G10L 15/02 |
| 2020/0226327 A1* | 7/2020 | Matusov | G06N 3/045 |
| 2021/0065690 A1* | 3/2021 | Indurthi | G10L 15/183 |
| 2021/0312938 A1* | 10/2021 | Yun | G10L 25/21 |
| 2021/0390943 A1* | 12/2021 | Gao | G06N 3/088 |
| 2022/0059082 A1* | 2/2022 | Saon | G06F 17/18 |
| 2022/0115006 A1* | 4/2022 | Hori | G10L 15/07 |
| 2022/0165281 A1* | 5/2022 | Laaksonen | G06F 40/58 |
| 2022/0208179 A1* | 6/2022 | Kurata | G10L 25/30 |
| 2022/0319494 A1* | 10/2022 | Thomas | G10L 15/16 |
| 2023/0169281 A1* | 6/2023 | Zheng | G10L 15/16 704/2 |
| 2023/0186903 A1* | 6/2023 | Cui | G06N 3/044 704/232 |

FOREIGN PATENT DOCUMENTS

| | | | | |
|---|---|---|---|---|
| CN | 116868203 A | * | 10/2023 | G06N 3/044 |
| GB | 2601162 A | * | 5/2022 | G06T 13/40 |

OTHER PUBLICATIONS

Weiss, Ron J., et al. "Sequence-to-sequence models can directly translate foreign speech." arXiv preprint arXiv:1703.08581. (Year: 2017).*

Gulcehre, Caglar, et al. "Plan, attend, generate: Planning for sequence-to-sequence models." Advances in Neural Information Processing Systems 30 (2017). (Year: 2017).*

Berard, Alexandre, et al. "End-to-end automatic speech translation of audiobooks." 2018 IEEE International Conference on Acoustics, Speech and Signal Processing (ICASSP). (Year: 2018).*

Inaguma, Hirofumi, et al. "Multilingual end-to-end speech translation." 2019 IEEE Automatic Speech Recognition and Understanding Workshop (ASRU). IEEE, 2019. (Year: 2019).*

Jia, Ye, et al. "Direct speech-to-speech translation with a sequence-to-sequence model." arXiv preprint arXiv:1904.06037. (Year: 2019).*

Liu, Yuchen, et al. "End-to-end speech translation with knowledge distillation." arXiv preprint arXiv:1904.08075. (Year: 2019).*

Matusov, Evgeny, et al. "Neural speech translation at apptek." Proceedings of the 15th International Conference on Spoken Language Translation. (Year: 2018).*

Bérard, Alexandre, et al. "End-to-end automatic speech translation of audiobooks." 2018 IEEE International Conference on Acoustics, Speech and Signal Processing (ICASSP). IEEE. (Year: 2018).*

Wang, Chengyi, et al. "Bridging the gap between pre-training and fine-tuning for end-to-end speech translation." Proceedings of the AAAI Conference on Artificial Intelligence. vol. 34. No. 05. 2020. (Year: 2020).*

Kano, Takatomo, Sakriani Sakti, and Satoshi Nakamura. "Transformer-based direct speech-to-speech translation with transcoder." 2021 IEEE Spoken Language Technology Workshop (SLT). IEEE. (Year: 2021).*

Cattoni, et al., "MuST-C: A multilingual corpus for end-to-end speech translation", In Journal of Computer Speech & Language, vol. 66, Mar. 1, 2021. 14 Pages.

Ma, et al., "Streaming Simultaneous Speech Translation with Augmented Memory Transformer", In Proceedings of IEEE International Conference on Acoustics, Speech and Signal Processing, Jun. 6, 2021, pp. 7523-7527.

"International Search Report and Written Opinion Issued in PCT Application No. PCT/IB22/000789", Mailed Date: May 4, 2023, 12 Pages.

Ren, et al., "SimulSpeech: End-to-End Simultaneous Speech to Text Translation", In Proceedings of the 58th Annual Meeting of the Association for Computational Linguistics, Jul. 5, 2020, pp. 3787-3796.

Wang, et al., "Improving Cross-Lingual Transfer Learning for End-to-End Speech Recognition with Speech Translation", In Repository of arXiv:2006.05474v2, Oct. 9, 2020, 5 Pages.

Chen, et al., "Developing Real-Time Streaming Transformer Transducer for Speech Recognition on Large-Scale Dataset", In Proceedings of IEEE International Conference on Acoustics, Speech and Signal Processing, Jun. 6, 2021, pp. 5904-5908.

Pino, et al., "Harnessing Indirect Training Data for End-to-End Automatic Speech Translation: Tricks of the Trade", In Repository of arXiv: 1909.06515v2, Oct. 22, 2019, 9 Pages.

* cited by examiner

END-TO-END STREAMING SPEECH TRANSLATION WITH NEURAL TRANSDUCER

BACKGROUND

Automatic speech recognition (ASR) systems and other speech processing systems are used to process and decode audio data to detect speech utterances (e.g., words, phrases, and/or sentences). The processed audio data is then used in various downstream tasks such as search-based queries, speech to text transcription, language translation, etc. In particular for language translation, typically a separate language translation module is used which is configured to perform text-to-text translation from a source language to a target language.

Conventional ASR systems receive input audio (i.e., source audio) in the source language and output a text-based transcription of spoken language utterances that are recognized in the input audio. Notably, the text-based transcription is output in the same source language as the input audio. Therefore, if a user wants to translate the input audio into a new language, the input audio must first be transcribed using an ASR system. Then, the transcription is subsequently applied as input to a machine translation system which translates the first transcription produced in the source language into a newly generated and translated second transcription in the desired target language. It will be appreciated that this sequential/cascading processing, which is currently required to generate a transcription in a target language that is different than the language of the source audio, is computationally intensive and can incur undesired latency.

In view of the foregoing, there is an ongoing need for improved systems and methods for performing speech translation services. The subject matter claimed herein is not limited to embodiments that solve any disadvantages or that operate only in environments such as those described above. Rather, this background is only provided to illustrate one exemplary technology area where some embodiments described herein may be practiced.

SUMMARY

Disclosed embodiments include systems, methods and devices for building and training end-to-end automatic speech translation models and for performing direct speech translation.

Some disclosed systems are configured to generate a training dataset comprising an audio dataset comprising spoken language utterances in a first language and a text dataset comprising transcription labels in a second language. The transcription labels included in the text dataset correspond to the spoken language utterances. Disclosed systems also include or are configured to obtain (i) an end-to-end automatic speech translation (AST) model based on a neural transducer comprising at least an acoustic encoder which is configured to receive and encode audio data, (ii) a prediction network which is integrated in a parallel model architecture in the neural transducer in the end-to-end AST model and configured to predict a subsequent language token based on a previous transcription label output, and (iii) a joint layer which is integrated in series with the acoustic encoder and prediction network. The joint layer is configured to combine an acoustic encoder output from the acoustic encoder and a prediction output from the prediction network.

Disclosed systems are also configured to apply the training dataset to the end-to-end AST model to configure the end-to-end AST model to generate a transcription in the second language of input audio data in the first language such that the neural transducer learns a plurality of temporal processing paths.

Some disclosed embodiments are also directed to end-to-end automatic speech translation models that are configured to receive input audio in a first language and generate a transcription of the input audio in a second language. In such embodiments, the end-to-end automatic speech translation model comprises an acoustic encoder comprising a plurality of temporal processing paths configured to receive and encode input audio data. The input audio data comprises a particular number of frames which is configured to be separated into different sets of frames. Each temporal processing path is configured to process the particular number of frames according to a particular combination of one or more different sets of frames included in the input audio data. The acoustic encoder is configured to output an intermediary feature representation for each different set of frames.

The end-to-end automatic speech translation models described herein further include a prediction network that is integrated in a parallel model architecture with the acoustic encoder in the end-to-end AST model. The prediction network being configured to predict a subsequent language token based on a previous transcription label output. The end-to-end automatic speech translation model also comprises a joint layer integrated in series with the acoustic encoder and the prediction network in the end-to-end AST model. The joint layer is configured to combine a prediction output from the prediction network and a neural transducer output from the neural transducer.

Some disclosed embodiments are also directed to systems and methods for performing direct speech translation using an end-to-end automatic speech translation model based on a neural transducer. In such embodiments, systems are configured to obtain an automatic speech translation model that comprises (i) an acoustic encoder, (ii) a prediction network, and (iii) a joint layer. The acoustic encoder is configured to receive and encode input audio data that comprises a particular number of frames which is configured to be separated into different sets of frames. Each temporal processing path is configured to process the particular number of frames according to a particular combination of the different of frames included in the input audio data. The acoustic encoder is configured to output an intermediary feature representation for each different set of frames.

The prediction network is integrated in a parallel model architecture with the neural encoder in the end-to-end automatic speech translation model. The prediction network is configured to predict a subsequent language token based on a previous transcription label output. The joint layer is integrated in series with the acoustic encoder and the prediction network in the end-to-end automatic speech translation model. The joint layer is configured to combine a prediction output from the prediction network and an acoustic encoder output from the acoustic encoder.

After obtaining the automatic speech translation model, the systems are configured to identify a target output language in which to generate transcription data of the input audio data and identify a source input language associated with the input audio data. Upon determining that the source input language and the target output language are different languages, the systems dynamically select a particular temporal processing path of the plurality of processing paths by which to convert the input audio data in the source input language to transcription data in the target output language. Subsequently, the systems are configured to generate a transcription in the target output language from the input audio data in the source input language by at least using the particular temporal processing path to convert the input audio data to transcription data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be limiting in scope, embodiments will be described and explained with additional specificity and detail through the use of the accompanying drawings in which.

DETAILED DESCRIPTION

Figure 1:
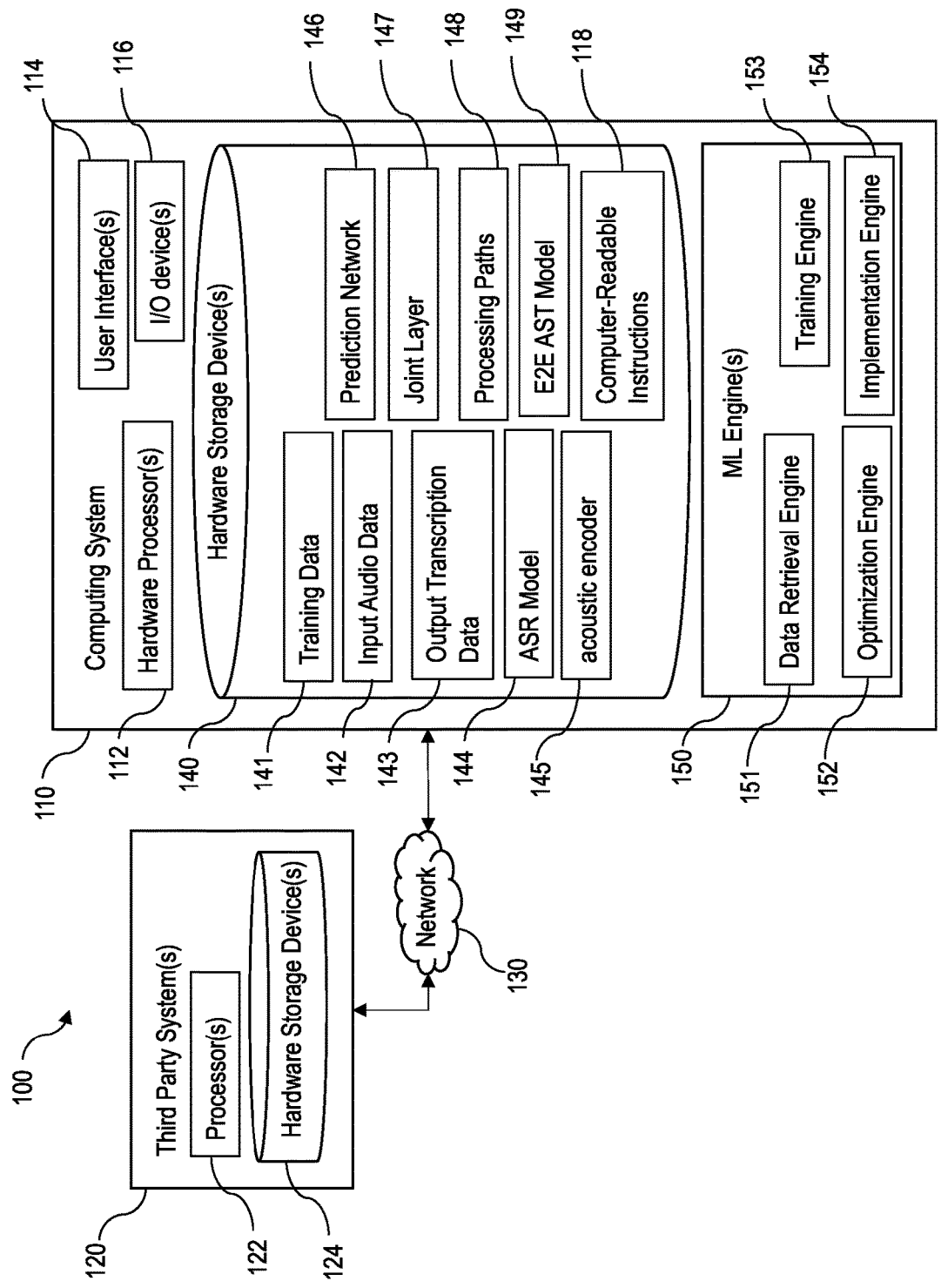
FIG. 1 illustrates a computing environment in which a computing system incorporates and/or is utilized to perform disclosed aspects of the disclosed embodiments.

Disclosed embodiments include systems, methods, and frameworks for configuring, training and/or utilizing end-to-end automatic speech translation models configured for performing direct speech translation.

The disclosed embodiments provide many technical advantages over existing systems. First, as mentioned earlier, conventional speech translation systems utilize a cascading or sequential processing pipeline that uses multiple different independent models for, first, using an automatic speech recognition system to convert source-language audio into a source-language text transcription then, next, using a separate machine translation system to convert the source-language text into a target-language text. However, for conventional cascaded systems to be successful, their automatic speech recognition systems and machine translation systems must both be trained separately on a large amount of industry-scale training data, including tens of thousands of hours of speech data. Such systems require large memory consumption because of their overall model/system size. Their processing is also very computationally expensive and time intensive, particularly since each system component must be trained separately on different types of datasets. Additionally, with conventional systems, any errors that are generated in the automatic speech recognition model will be propagated into the machine translation step of the system data processing.

In contrast, the disclosed end-to-end automatic speech translation models have lower latency and a much more compact model size than conventional cascaded systems. Furthermore, the error propagation problem is mitigated in the disclosed embodiments, as will be described in more detail throughout.

While there are some new and existing end-to-end automatic speech translation systems being used in the industry, the existing systems employ attention-based encoder and decoder models, where the argument of attention is configured to handle the word reordering challenge in translation. In such systems, and in order to accommodate for streaming applications, partial attention is employed which weakens the system's overall power to handle word re-ordering.

However, the disclosed embodiments are directed to an end-to-end speech translation model based on recurrent neural network transducer (RNN-T) structure (or neural transducer generally speaking) which employs flexible neural transformer pathways. In these disclosed end-to-end speech translation models, no attention (or even partial attention) is required, thus preserving the full robust capability of the model to handle word reordering during translation and to reduce any propagation of errors from wrongly ordered words. As the neural transducer is designed for natural streaming, the end-to-end models in the disclosed embodiments perform better than other attention-based end-to-end models for streaming speech translation. Furthermore, the end-to-end speech translation models in the disclosed embodiments also have smaller latency than other attention-based end-to-end speech translation models.

Additionally, because of the streamlined architecture of the end-to-end automatic speech translation model for processing the input audio data, any backpropagation that occurs during training of the end-to-end automatic speech translation model can be reduced, thus requiring less training data and less time for training on the training data. In contrast, a sequential models (i.e., as described in regard to conventional models) have longer/deeper pipelines, which require more extensive training because of the added length of backpropagation between the sequential layers, models, or systems. Accordingly, the parallel architecture of the disclosed embodiments provides for a machine learning module that requires fewer parameters to perform direct speech translation than is required for conventional sequential or cascaded modules.

An additional advantage of the disclosed embodiments includes utilizing only augmented data for training the end-to-end automatic speech translation system, instead of using raw speech translation data. This is beneficial because raw speech translation data is time-consuming and expensive to obtain and must be labeled, typically by a human. However, augmented, or synthesized data can be easily generated, including generating particular datasets that correspond to a new domain for which a user desires to train the end-to-end automatic speech translation system.

In light of the aforementioned technical advantages, including those described below, the disclosed embodiments are able to achieve improvements over existing systems and methods for performing speech translation by providing improved systems and methods for obtaining, training, and utilizing high-accuracy, low latency, and compact end-to-end automatic speech translation models to perform speech translation services. These technical advantages are especially important when performing direct speech translation in streaming applications, where the user experience is enhanced with low latency of the speech translation coupled with high speech recognition and translation accuracy.

Attention is now be directed to FIG. 1, which illustrates components of a computing system 110 which may include and/or be used to implement aspects of the disclosed invention. As shown, the computing system includes a plurality of machine learning (ML) engines, models, neural networks, and data types associated with inputs and outputs of the machine learning engines and models.

The computing system 110 as part of a computing environment 100 that also includes third-party system(s) 120 in communication (via a network 130) with the computing system 110. The computing system 110 is configured to generate or otherwise obtain a machine learning module configured as an end-to-end automatic speech translation model 149 (e.g., end-to-end (E2E) AST Model).

Additionally, the computing system 110 is configured to generate training data 141 and train the end-to-end automatic speech translation model 149, as well as perform direct speech translation utilizing the trained end-to-end automatic speech translation model. The end-to-end automatic speech translation model 149 based on neural transducer comprises at least an acoustic encoder 145, a prediction network 146 configured in parallel with the acoustic encoder, and a joint layer 147 configured in series with the acoustic encoder and prediction network. The neural transducer is optimized according to the probability of a plurality of temporal processing paths 148. It should be appreciated that the neural transducer is configurable as different types of transducers including a transformer-transducer (T-T) and/or a recurrent neural network transducer (RNN-T), or other type of transducer that is configured to process input audio data.

The computing system 110 includes one or more processor(s) (such as one or more hardware processor(s)) 112 and a storage (i.e., hardware storage device(s) 140) storing computer-readable instructions 118, wherein one or more of the hardware storage device(s) 140 is able to house any number of data types and any number of computer-readable instructions 118 by which the computing system 110 is configured to implement one or more aspects of the disclosed embodiments when the computer-readable instructions 118 are executed by the one or more processor(s) 112. The computing system 110 is also shown including user interface(s) 114 and input/output (I/O) device(s) 116.

As shown in FIG. 1, hardware storage device(s) 140 is shown as a single storage unit. However, it will be appreciated that the hardware storage device(s) 140 is, a distributed storage that is distributed to several separate and sometimes remote systems and/or third-party system(s) 120. The computing system 110 can also comprise a distributed system with one or more of the components of computing system 110 being maintained/run by different discrete systems that are remote from each other and that each perform different tasks. In some instances, a plurality of distributed systems performs similar and/or shared tasks for implementing the disclosed functionality, such as in a distributed cloud environment.

The storage (e.g., hardware storage device(s) 140) includes computer-readable instructions 118 for instantiating or executing one or more of the models and/or engines shown in computing system 110. The models are configured as machine learning models or machine learned models, such as deep learning models and/or algorithms and/or neural networks. In some instances, the one or more models are configured as engines or processing systems (e.g., computing systems integrated within computing system 110), wherein each engine comprises one or more processors (e.g., hardware processor(s) 112) and computer-readable instructions 118 corresponding to the computing system 110. In some configurations, a model is a set of numerical weights embedded in a data structure, and an engine is a separate piece of code that, when executed, is configured to load the model, and compute the output of the model in context of the input audio.

The hardware storage device(s) 140 are configured to store and/or cache in a memory store the different data types including training data 141, input audio data 142, and output transcription data 143, described herein. The training data 141 comprises (i) text data and (ii) audio data that comprises speech utterances corresponding to words, phrases, and sentences included in the text data. In other words, the speech utterances are the ground truth output for the text data input.

The text data comprises sequences of characters, symbols, and/or number extracted from a variety of sources. For example, the text data comprises text message data, contents from emails, newspaper articles, webpages, books, mobile application pages, etc. In some instances, the characters of the text data are recognized using optical text recognition of a physical or digital sample of text data. Additionally, or alternatively, the characters of the text data are recognized by processing metadata of a digital sample of text data. The text data is configured to processed by a TTS system in order to generate synthesized speech. In some embodiments, the text data is automatically generated by a text generation system.

The audio data comprises a mixture of simulated clean speech (e.g., clean reference audio data) and one or more of: room impulse responses, isotropic noise, or ambient or transient noise for any particular actual or simulated environment or one that is extracted using text-to-speech technologies. Thus, parallel clean audio data and noisy audio data is generated using the clean reference audio data on the one hand, and a mixture of the clean reference audio data and background noise data. Simulated noisy speech data is also generated by distorting the clean reference audio data.

The synthesized speech comprises synthesized audio data comprising speech utterances corresponding to words, phrases, and sentences recognized in the text data. The synthesized speech comprises speech utterances in different speaker voices, different languages, different speaking styles, etc. The synthesized speech comprises speech utterances that are characterized by the encoded features (e.g., acoustic features and linguistic features). The synthesized speech is also characterized and/or customizable based on the vocoder used to process the Mel spectrum and generate the audio file (i.e., synthesized speech). In some instances, the synthesized speech is beneficially generated to mimic natural language audio.

The output transcription data 143 comprises computer-generated transcription labels for words recognized in and translated from the input audio. If the target language is different than the source language, then the output transcription data 143 comprises text utterances corresponding to spoken language utterances in the input audio data 142, but generated in the target language (i.e., translated from the source language). In some instances, the end-to-end automatic speech translation model outputs a final output in the form of audio, which is a text-to-speech output that generates an audio file based on the output transcription data in the new language.

An additional storage unit for storing machine learning (ML) Engine(s) 150 is presently shown in FIG. 1 as storing a plurality of machine learning models and/or engines. For example, computing system 110 comprises one or more of the following: a data retrieval engine 151, an optimization engine 152, a training engine 153, and an implementation engine 154, which are individually and/or collectively configured to implement the different functionality described herein.

The computing system also is configured with a data retrieval engine 151, which is configured to locate and access data sources, databases, and/or storage devices comprising one or more data types from which the data retrieval engine 151 can extract sets or subsets of data to be used as training data (e.g., training data 141) and as input text data (e.g., text data). The data retrieval engine 151 receives data from the databases and/or hardware storage devices, wherein the data retrieval engine 151 is configured to reformat or otherwise augment the received data to be used in the text recognition and TTS applications. Additionally, or alternatively, the data retrieval engine 151 is in communication with one or more remote systems (e.g., third-party system(s) 120) comprising third-party datasets and/or data sources. In some instances, these data sources comprise audio-visual services that record or stream text, images, and/or video. The data retrieval engine 151 is configured to audio data in real-time, such that the input audio data 142 is "streaming" and being processed in real-time (i.e., a user sees the transcription data corresponding to the input audio data at the same rate as the input audio data 142 is being retrieved, recognized, and translated).

The data retrieval engine 151 accesses electronic content comprising one or more types of audio-visual data including audio data, video data, image data, holographic data, 3-D image data, etc. In some instances, the data retrieval engine 151 is a smart engine that is able to learn optimal dataset extraction processes to provide a sufficient amount of data in a timely manner as well as retrieve data that is most applicable to the desired applications for which the machine learning models/engines will be used.

The optimization engine 152 is configured to optimize the end-to-end automatic speech translation model 149, in particular by training and configuring the end-to-end automatic speech translation model 149 to learn which temporal processing paths 148 included in the neural transducer 145 are the optimal path by which to process input audio data 142 and translate the input audio data 142 from the source input language to the target output language. For example, the optimization engine 152 is configured to help the end-to-end automatic speech translation model 149 which temporal processing paths (e.g., processing paths 148) should be used when there is little to no word reordering required for translation for a particular pair of languages versus when there is significant word reordering required for translation between a different pair of languages.

The optimization engine 152 is configured to optimize, at least the parameters for latency and accuracy (i.e., decreasing latency to the greatest extent while still maintaining an acceptable level of accuracy). In some embodiments, the optimization engine 152 is configured to optimize according to a particular scenario or context of the input audio data 142. For example, some contexts may signal to the optimization engine 152 to optimize for the highest accuracy, while other contexts may signal to the optimization engine 152 to optimize for the lowest latency.

The training engine 153 is configured to train the end-to-end automatic speech translation model and/or the individual components (e.g., the neural transducer, the prediction network, and/or joint layer). The training engine 153 is also configured to train an automatic speech recognition model 144 which is convertible/trainable into an end-to-end automatic speech translation model 149. In particular, the training engine 153 is configured to train the end-to-end automatic speech translation model 149 to translate input audio data 142 in a first language into output transcription data 143 in a second language.

The computing system 110 also includes an implementation engine 154, which is in communication with any one or more of the models and/or ML engine(s) 150 of the computing system 110, such that the implementation engine 154 is configured to implement, initiate, or run one or more functions of the plurality of ML engine(s) 150. In one example, the implementation engine 154 is configured to operate the data retrieval engine 151 so that the data retrieval engine 151 retrieves data at the appropriate time to be able to obtain input audio data 142. The implementation engine 154 facilitates the process communication and timing of communication between one or more of the ML engine(s) 150 and is configured to implement and operate a machine learning model (or one or more of the ML engine(s) 150).

It is also noted that the computing system 110 is in communication with third-party system(s) 120 comprising one or more processor(s) 122, one or more of the computer-readable instructions 118, and one or more hardware storage device(s) 124. It is anticipated that, in some instances, the third-party system(s) 120 further comprise databases housing data that could be used as training data, for example, text data not included in local storage. Additionally, or alternatively, the third-party system(s) 120 include machine learning systems external to the computing system 110. The third-party system(s) 120 are software programs or applications.

By configuring and/or utilizing a computing system 110, as described above, it is possible to implement the disclosed method in a manner that provides many technical advantages over existing systems, including the ability to generate, train and utilize improved end-to-end automatic speech translation models that produce high quality speech translation data. For example, the disclosed embodiments are directed to an end-to-end automatic speech translation model that generates accurate output transcription data with low latency, especially in streaming input audio data applications.

Figure 2:
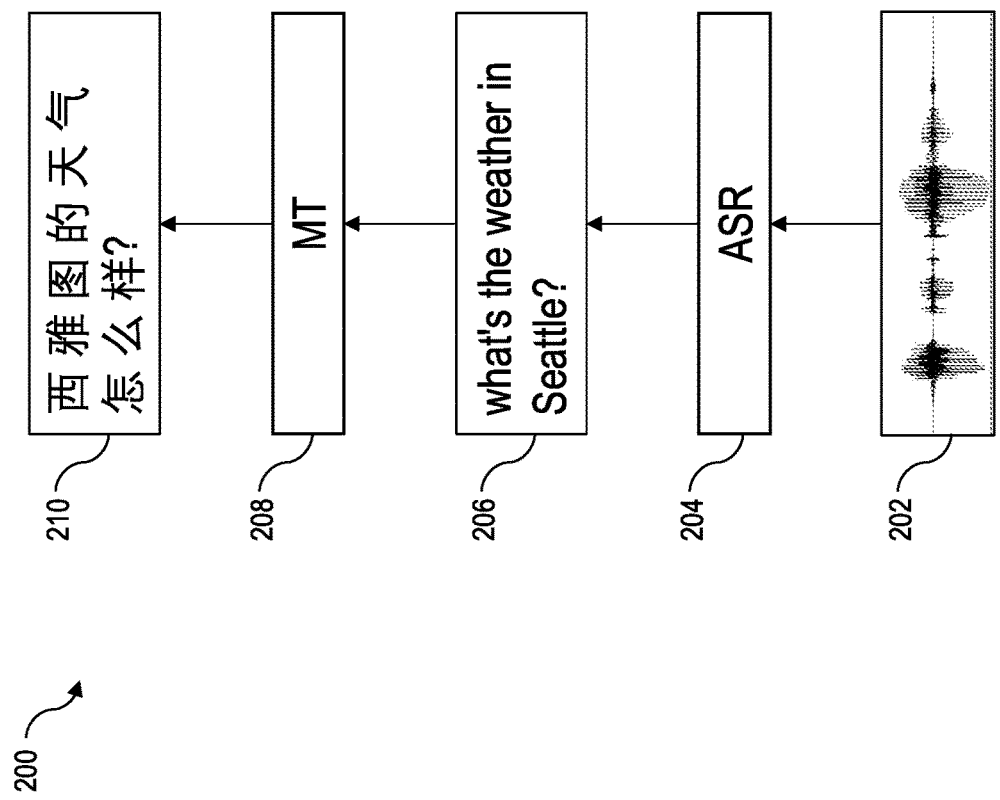
FIG. 2 illustrates an example embodiment of a process flow diagram for performing speech translation using a cascaded model architecture.

Attention will now be directed to FIG. 2, which illustrates an example embodiment of a process flow diagram for performing speech translation using a conventional cascaded model architecture 200. The conventional cascaded model architecture 200 is shown having an automatic speech recognition model 204 and a machine translation system 208.

Source language audio 202 is applied as input to the automatic speech recognition model 204 which is configured to output transcription data 206 in the source language (i.e., the same language as the source language audio). The output transcription data 206 is then applied as input to the machine translation system 208 which is configured to output new transcription data 210 in the target language. As shown in FIG. 2, the source language audio 202 comprises the spoken language utterance ("What's the weather in Seattle?") in English (i.e., the source language). The output transcription data 206 comprises the sentence "What's the weather in Seattle?" as textual data in English. Finally, the new transcription data 210 output by the machine translation system 208 comprises "西雅图的天气怎么样?" which is the sentence for "What's the weather in Seattle?", but as translated textual data in Chinese. As described above, disadvantages of such an architecture include high processing latency, a large model/system size, degraded quality due to the need to use only partial attention for streaming applications (because of the usual high latency), and error propagation between the automatic speech recognition model 204 and the machine translation system 208.

Figure 3:
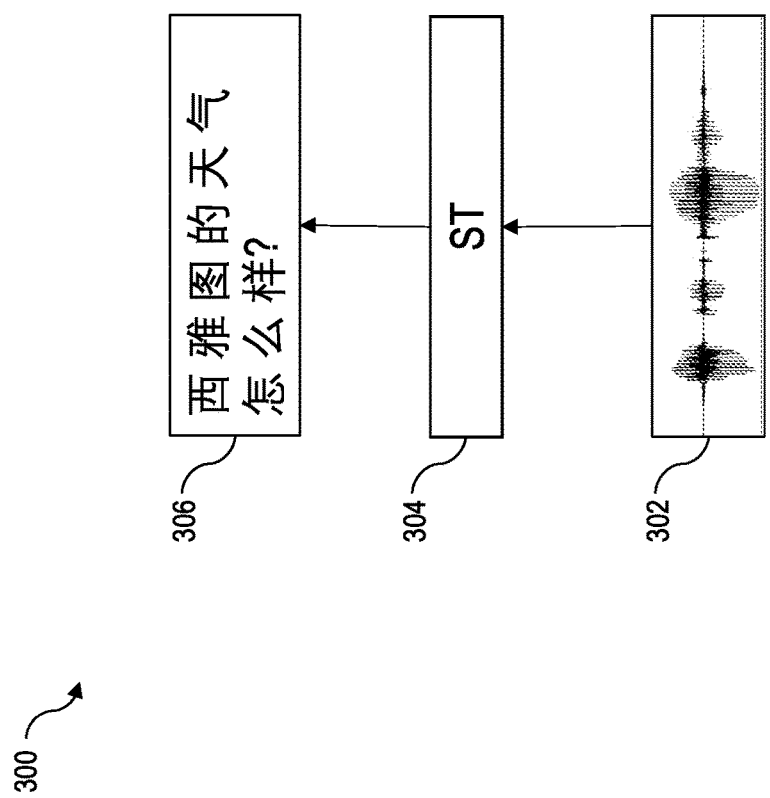
FIG. 3 illustrates an example embodiment of a process flow diagram for performing direct speech translation using an end-to-end automatic speech translation model.

Attention will now be directed to FIG. 3, which illustrates an example embodiment of a process flow diagram 300 for performing direct speech translation using an end-to-end automatic speech translation model which overcomes many of the shortcomings experienced by conventional speech translation systems (e.g., as described in FIG. 2). For example, the streamlined process for performing direct speech translation includes obtaining input audio data 302 in the source language.

The input audio data 302 is applied as input to the end-to-end automatic speech translation model 304 which is configured to output transcription data 306 of the input audio data 302 in the target language. As shown in FIG. 3, the input audio data comprises the spoken language utterance "What's the weather in Seattle?" in English. The output transcription data 306 comprises a transcription label "西雅图的天气怎么样?" which is Chinese text translated from the input audio data 302 in English, without generating intermediate recognition results of the source language. As described above, disclosed embodiments are directed to an end-to-end automatic speech translation model (e.g., as shown in FIG. 3) which provides many technical advantages which are improvements over conventional speech translation systems.

Figure 4:
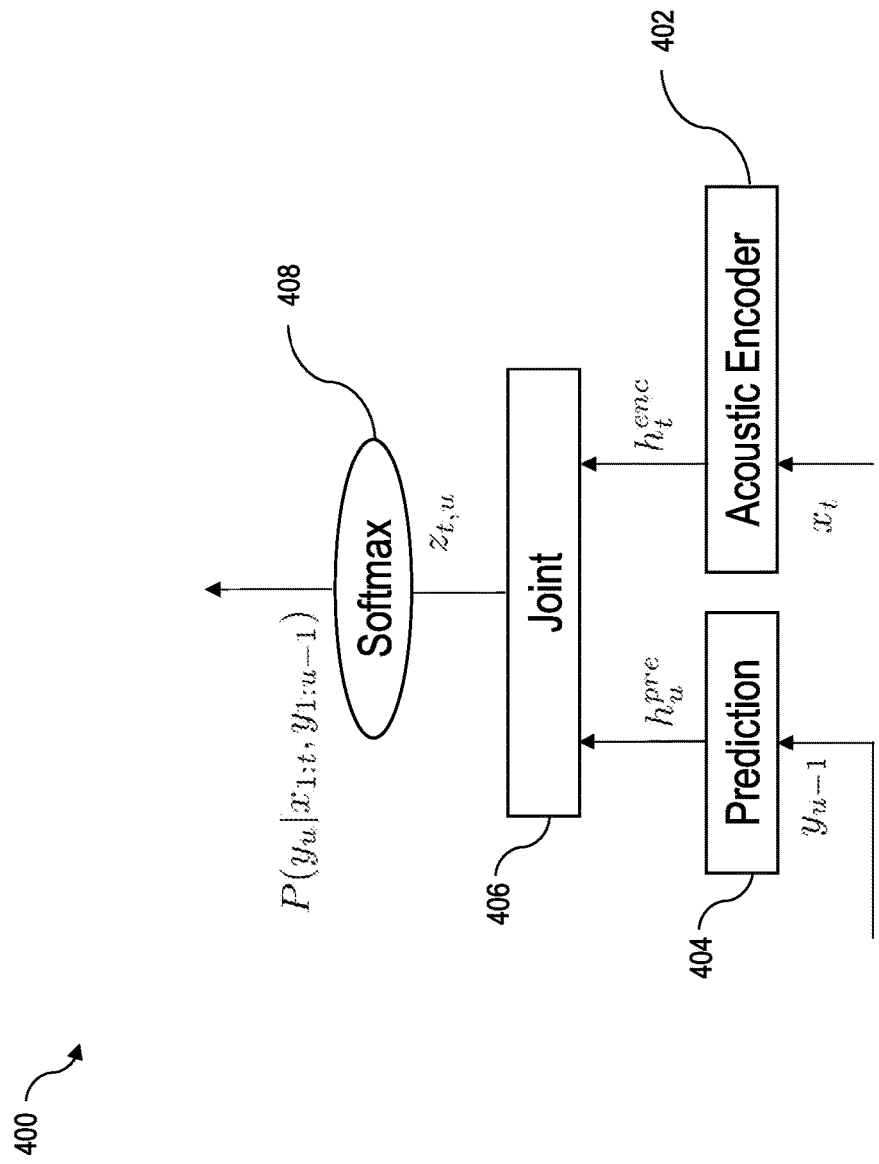
FIG. 4 illustrates an example embodiment of an end-to-end automatic speech translation model.

Attention will now be directed to FIG. 4, which illustrates an example embodiment of an end-to-end automatic speech translation model 400. For example, end-to-end automatic speech translation model 400 comprises an acoustic encoder 402, a prediction network 404, a joint layer 406, and a Softmax layer 408. The acoustic encoder 402 comprises a plurality of temporal processing paths configured to receive and encode input audio data (e.g., $x_t$) that comprises a particular number of frames which is configured to be separated into different sets of frames. Each of the different frame sets will have a unique combination of frame quantity and/or frame content relative to each of the other one or more different frame set(s). Additionally, each temporal processing path is configured to process the particular number of frames according to a particular combination of the different sets of frames included in the input audio data. The acoustic encoder 402 is also configured to output an intermediary feature representation (e.g., $h_t^{enc}$) for each different set of frames.

As shown in FIG. 4, the prediction network 404 is integrated in a parallel model architecture with the acoustic encoder in the end-to-end AST model. The prediction network 404 is configured to predict a subsequent language token (e.g., $h_u^{pre}$) based on a previous transcription label output (e.g., $y_{u-1}$). The joint layer 406 is integrated in series with the acoustic encoder 402 and the prediction network 404 in the end-to-end AST model 400. The joint layer 406 is configured to combine a prediction output (e.g., $h_u^{pre}$) from the prediction network 404 and an acoustic encoder output (e.g., $h_t^{enc}$) from the acoustic encoder 402. Finally, the combined output (e.g., $z_{t,u}$) is applied as input to the Softmax layer 408 which outputs a final output (e.g., $P(y_u|x_{1:t}, y_{1:u-1})$) for a particular set of frames (e.g., $x_t$). For the next set of frames, the prediction network 404 uses the previous final output as input to predict the next language token/label. In this manner, the prediction network 404 behaves as a language model and the encoder (e.g., acoustic encoder 402) behaves as an acoustic model of an automatic speech recognition model.

Figures 5A, 5B:
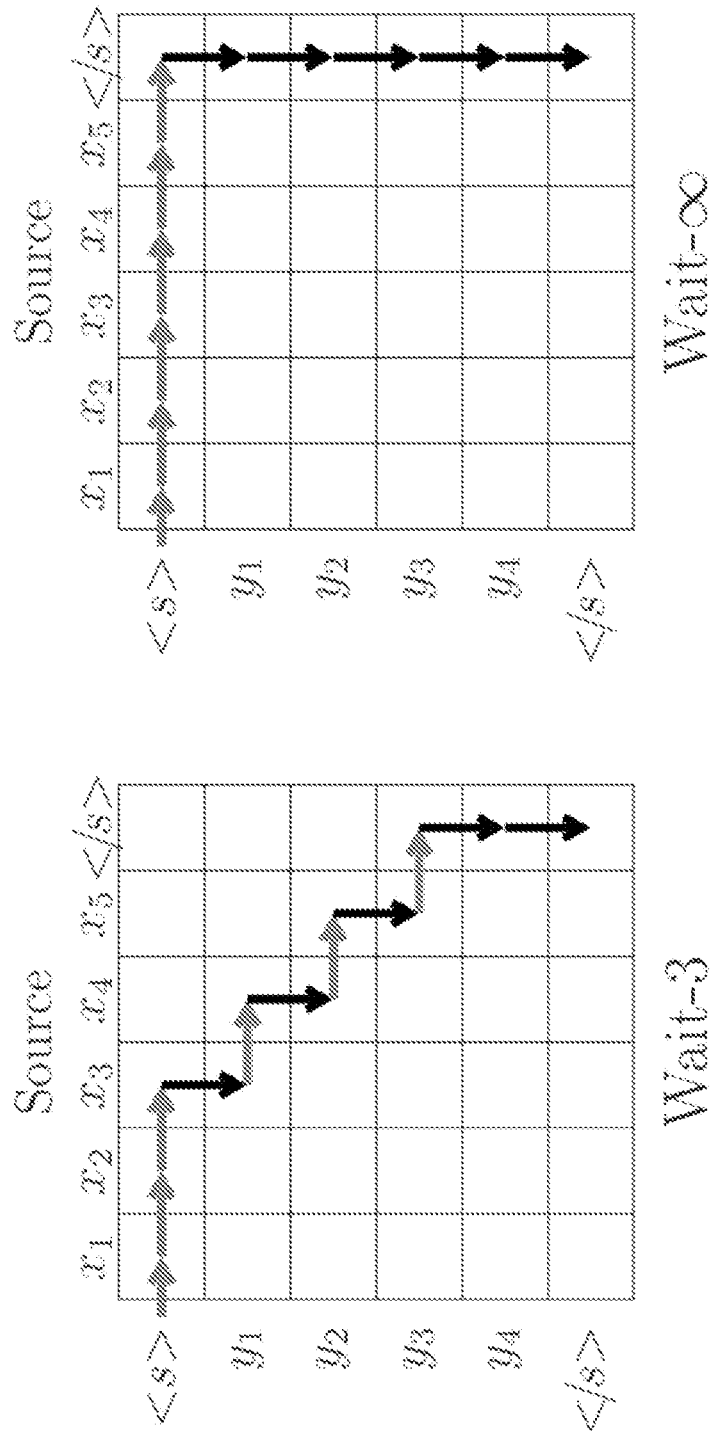
FIGS. 5A-5B illustrate an example embodiment of a process flow diagram for performing a wait-k speech processing technique.

Attention will now be directed to FIGS. 5A-5B, which illustrates an example embodiment of a process flow diagram for performing a wait-k speech processing technique. The number of frames included in each set of frames processed in series by the neural transducer is based on a technique referred to as Wait-K. For example, in FIG. 5A, the system is configured to wait 3 frames (e.g., wait until frame x3) before producing a neural transducer output (e.g., output y1). Output y1 is then used with frame x4 to produce output y2. In some instances, output y2 is an aggregated output which has the output for frames x1-x4. Similarly, output y2 is used to help produce the output y3 for frame x5 being processed, wherein output y3 is an aggregated output including encoded or labeled output for frames x1-x5.

Alternatively, each output only includes the output portion corresponding to the particular frame or particular set of frames that has been most recently processed. In this manner, the input audio has been separated into a first set of frames having three frames (x1-x3), a second set of frames having one frame (x4), and a third set of frames having one frame (x5). It should be appreciated that the input audio could have been separated into a different combination of sets of frames (e.g., a first set of frames of three frames (x1-x3) and a second set of frames of two frames (x4-x5) or five different set of frames including one frame each, which would correspond to a wait-1 frame regime. As shown in FIG. 5B, the system is configured to wait infinity, which in practical terms means to wait until the last frame of the input audio data before processing. For example, where there exist x1-x5 frames in the input audio, the system will process all five frames before producing output y1 (which includes output for the entire set of frames).

Figure 6:
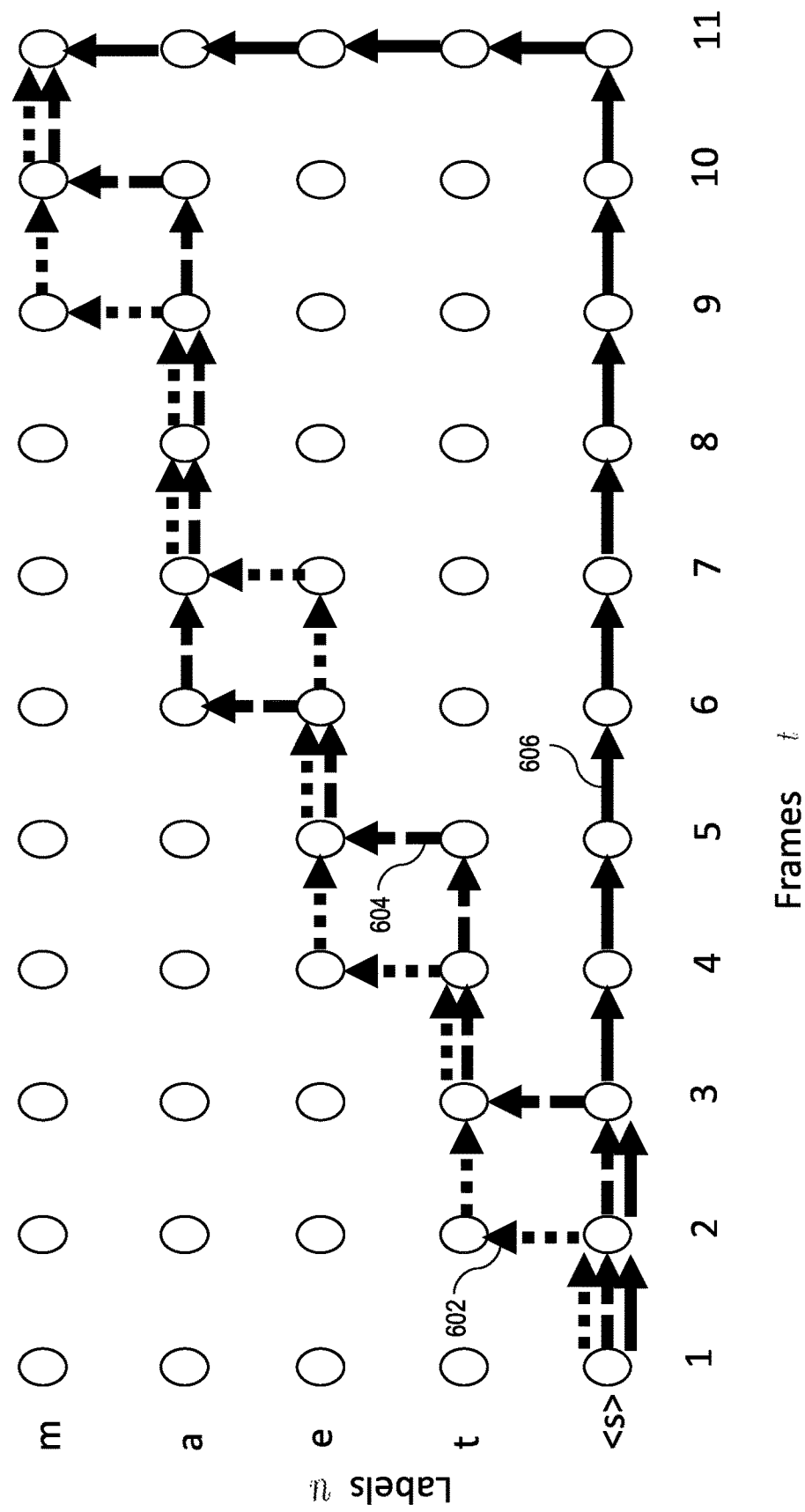
FIG. 6 illustrates an embodiment of a plurality of temporal processing paths included in the neural transducer.

Attention will now be directed to FIG. 6, which illustrates a different embodiment, which is associated with the claimed end-to-end automatic speech translation model, and which includes a plurality of temporal processing paths (e.g., temporal processing path 602, temporal processing path 604, temporal processing path 606) included in the neural transducer. Notably, the neural transducer of the end-to-end automatic speech translation model described herein is capable of learning any number of different temporal processing paths 600. These paths are flexible paths, meaning that each path is not constrained to a single wait-k regime, but rather learns through training and implementation the path that is best for translating between a particular set of languages.

Temporal processing paths 602 and 604 illustrate different embodiments of temporal processing paths that are utilized when there is little to no word-reordering required for translation between two different languages. For example, temporal processing path 602 temporal processing path 602 employs a wait-1 frame initial processing regime, waiting until frame 2 before generating a first output label t for frames 1 and 2. According to temporal processing path 602, the input audio is separated into five different sets of frames. The first set of frames includes frames 1-2 corresponding to output t, the second set of frames includes frames 3-4 corresponding to output e, the third set of frames includes frames 5-7 corresponding to output a, a fourth set of frames including frames 8-9 corresponding to output m, and so on. Additionally, temporal processing path 604 consumes the input audio according to a different combination of different sets of frames.

For example, temporal processing path 604 employs an initial wait-2 processing regime, which processes a first set of frames including frames 1-3 corresponding to output t, a second set of frames including frames 4-5 corresponding to output e, a third set of frames including frame 6 corresponding to output a, a fourth set of frames including frames 7-10 corresponding to output m, and so on. It should be appreciated that while temporal processing paths 602 and 604 appear to have a combination of four sets of frames, a temporal processing path is configurable to include any number of different, unique sets of frames. As shown in FIG. 6, temporal processing paths include sets of discrete frames, where one set of frames does include a frame of a different set (e.g., no overlapping frames). However, in some instances, accuracy may be improved by processing overlapping sets of frames.

Additionally, temporal processing path 606 illustrates an embodiment of a temporal processing path that is utilized when there is significant word-reordering required for translation between two different languages, employing a wait-infinity type processing regime (i.e., frames 1-11 are processed before generating an output m).

Figure 7:
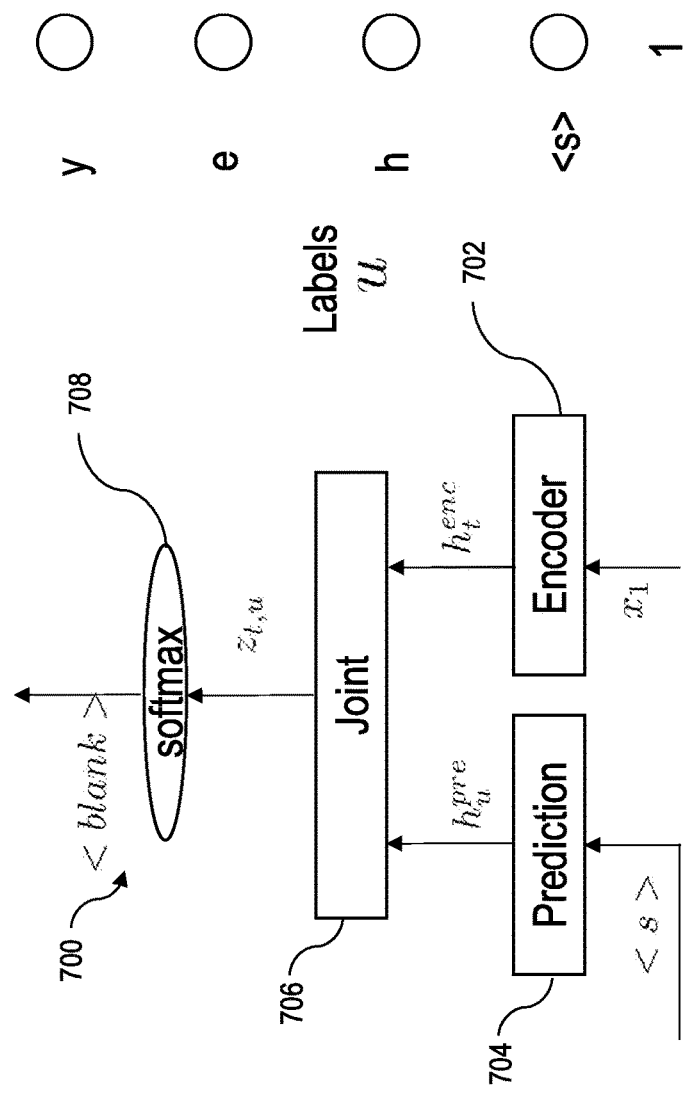
FIGS. 7-12 illustrate example embodiments of an end-to-end automatic speech translation model performing direct speech translation by processing input audio data with a temporal processing path included in the neural transducer.
Figure 8:
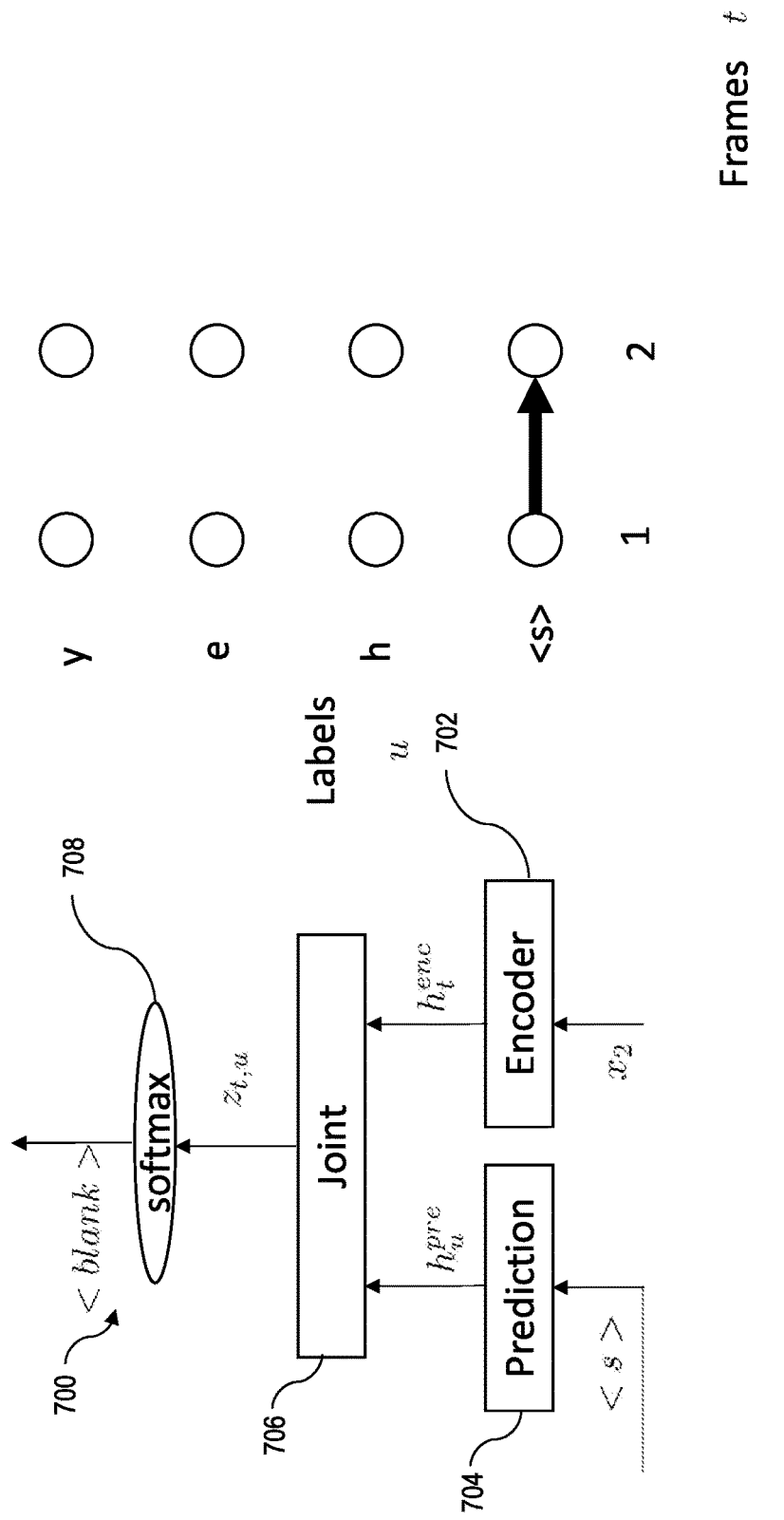
Figure 9:
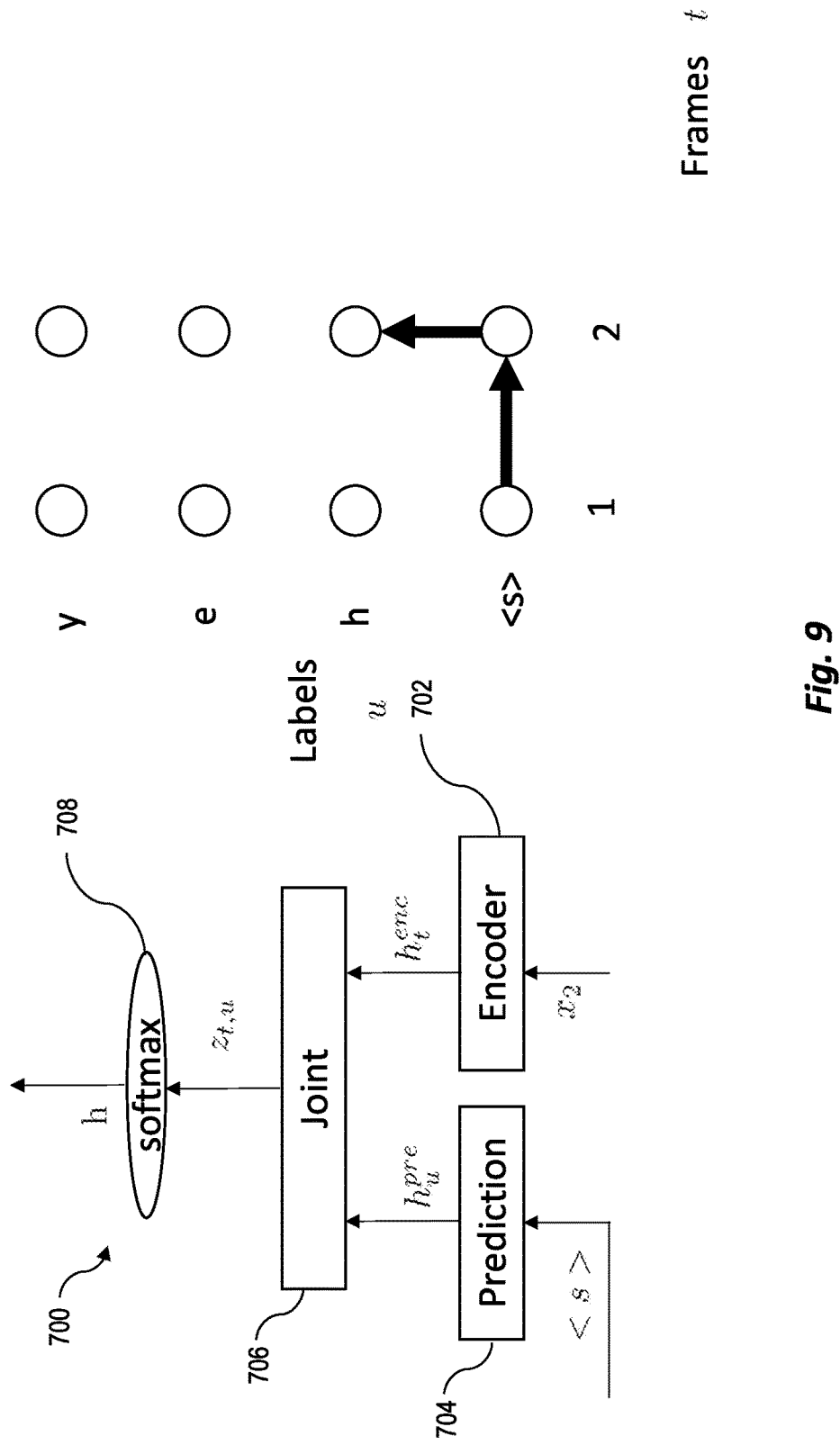

Attention will now be directed to FIGS. 7-12, which illustrate and example embodiment of an end-to-end automatic speech translation model 700 performing direct speech translation by processing input audio data with a temporal processing path included in the neural transducer. As shown in FIG. 7, to begin processing the input audio (which includes a particular number of frames "t"), the neural transducer receives the first frame (i.e., frame 1) but produces a blank output from the Softmax layer 708 because this particular temporal processing path is configured with an initial wait-1 processing regime. FIG. 8 illustrates the acoustic encoder 702 receiving frame 2 (e.g., $x_2$), meanwhile the prediction network 704 receives the previous output (e.g., <8>) which was a blank (e.g., <blank>). FIG. 9 illustrates the end-to-end automatic speech translation model 700 generating a first output "h" corresponding to frames 1-2. For example, after the acoustic encoder receives frame 2, it is configured to output an acoustic encoder output (e.g., $h_t^{enc}$). The prediction network receives the previous blank output from the Softmax layer and outputs a prediction network output (e.g., $h_u^{pre}$). These outputs are then received by the joint layer 706, which outputs a combined output (e.g., $z_{t,u}$). After applying a softmax layer 708, the end-to-end automatic speech translation model 700 outputs a final label h for frames 1-2.

Figure 10:
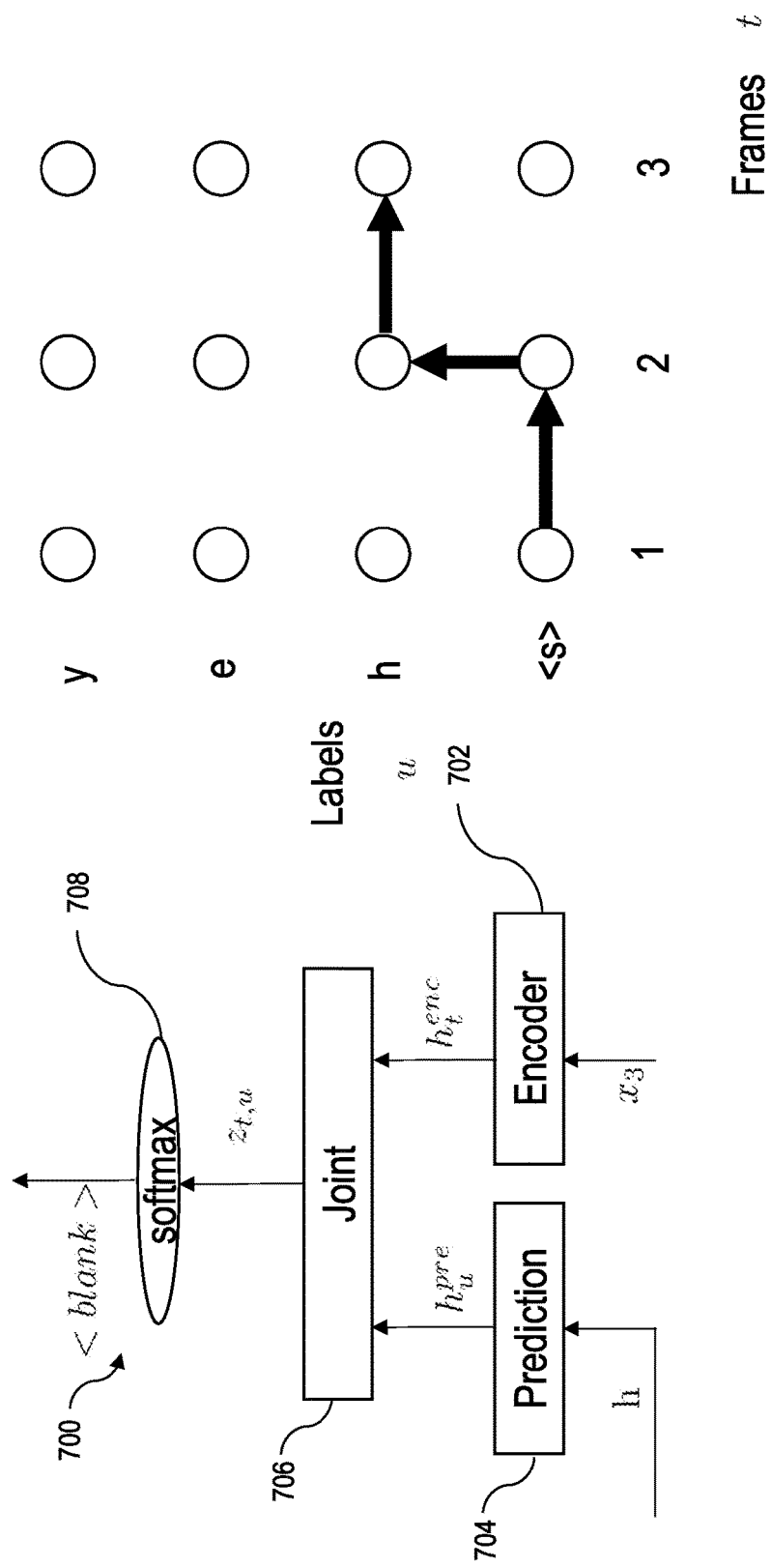
Figure 11:
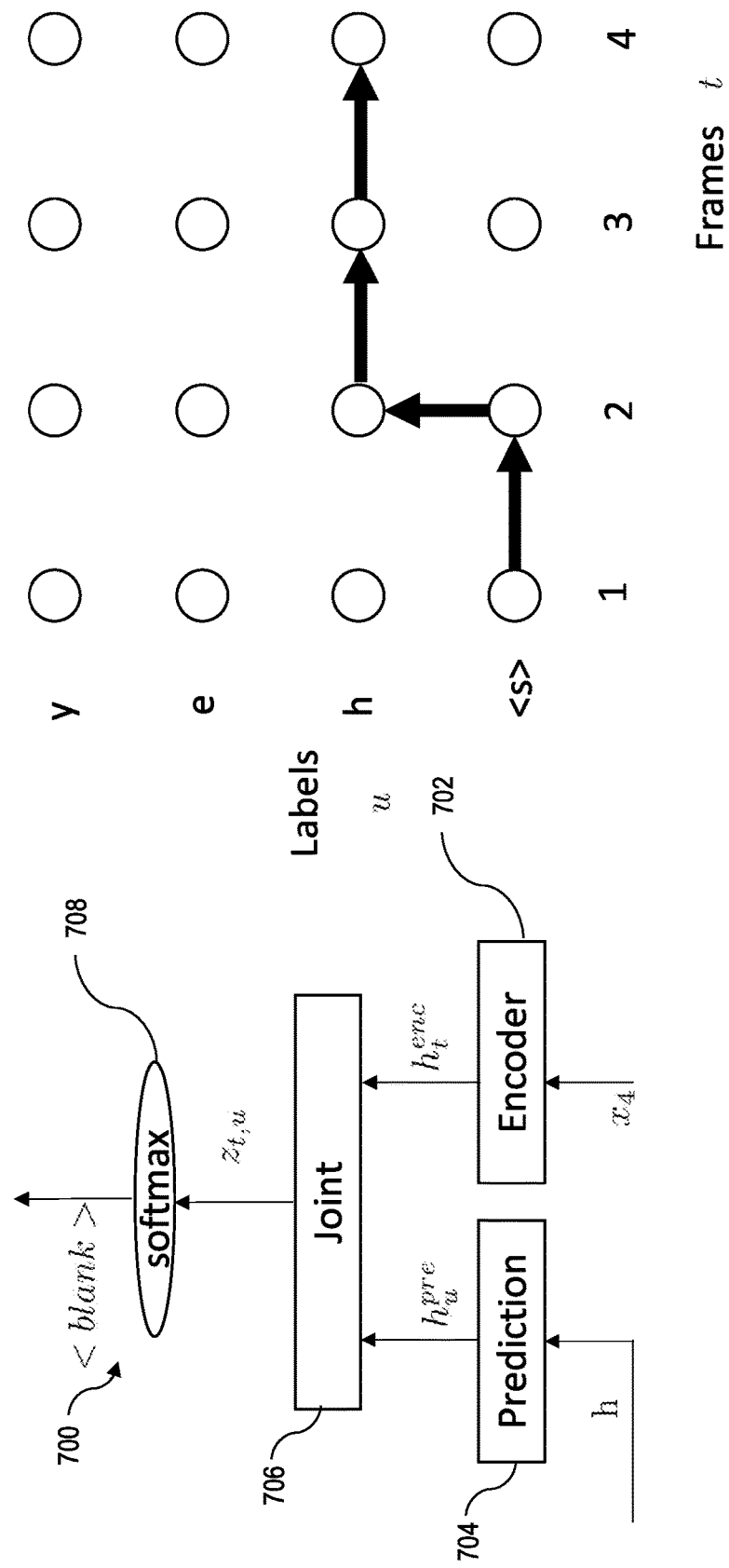

FIG. 10 illustrates the end-to-end automatic speech translation model 700 receiving frame 3 (e.g., $x_3$) at the acoustic encoder. However, this step produces a blank output because this particular temporal path includes frames 3-4 in the second set of frames (as shown in FIG. 11).

Figure 12:
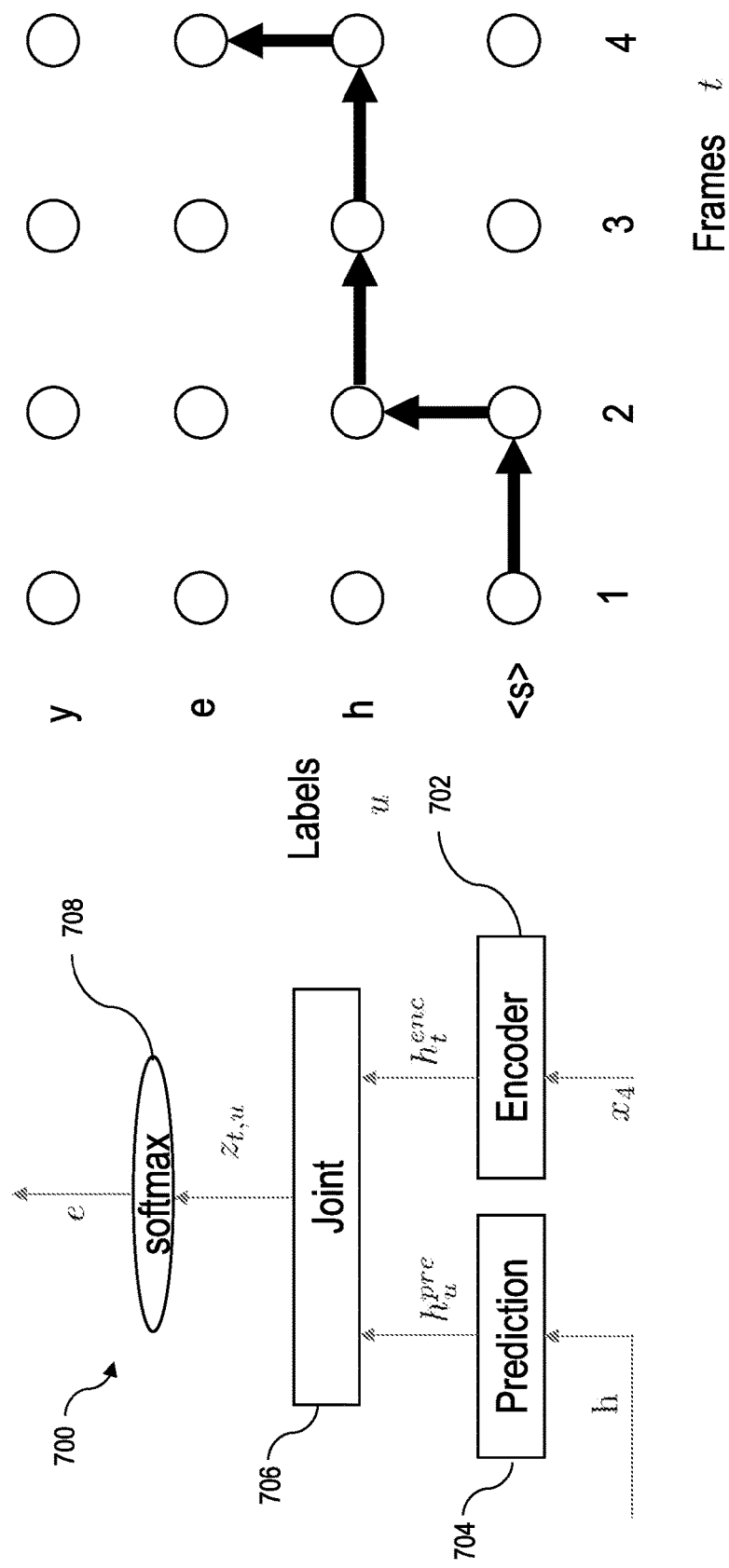

FIG. 12 illustrates the acoustic encoder receiving frame 4 generating output "e" which corresponds to frames 3-4. For example, the end-to-end automatic speech translation model 700 receives frame 4 (e.g., $x_4$) at the acoustic encoder 702 which outputs an acoustic encoder output (e.g., $h_t^{enc}$). The prediction network 704 receives the previous output (e.g., pre output h) and generates a prediction network output (e.g., $h_u^{pre}$). Both outputs are applied to the joint layer 706 as input and combined to produce joint layer output (e.g., $z_{t,u}$). After applying a Softmax layer 708, the end-to-end automatic speech translation model 700 outputs a label "e" for frames 3-4. This process will continue until the last frame of the input audio data is received and processed to produce a final output for the entire input audio.

It should be appreciated that the frames that are received by the end-to-end automatic speech translation model are part of an input audio dataset that comprises spoken language utterances in a source language. The output (either the joint layer output and/or the final SoftMax layer output) comprise textual transcription data labels for the portions of the input audio included in each frame or set of frames. The textual transcription data labels include labels in the target language, which is different than the source language in most translation instances. However, in some instances, the target language is a dialect of the source language.

Figure 13:
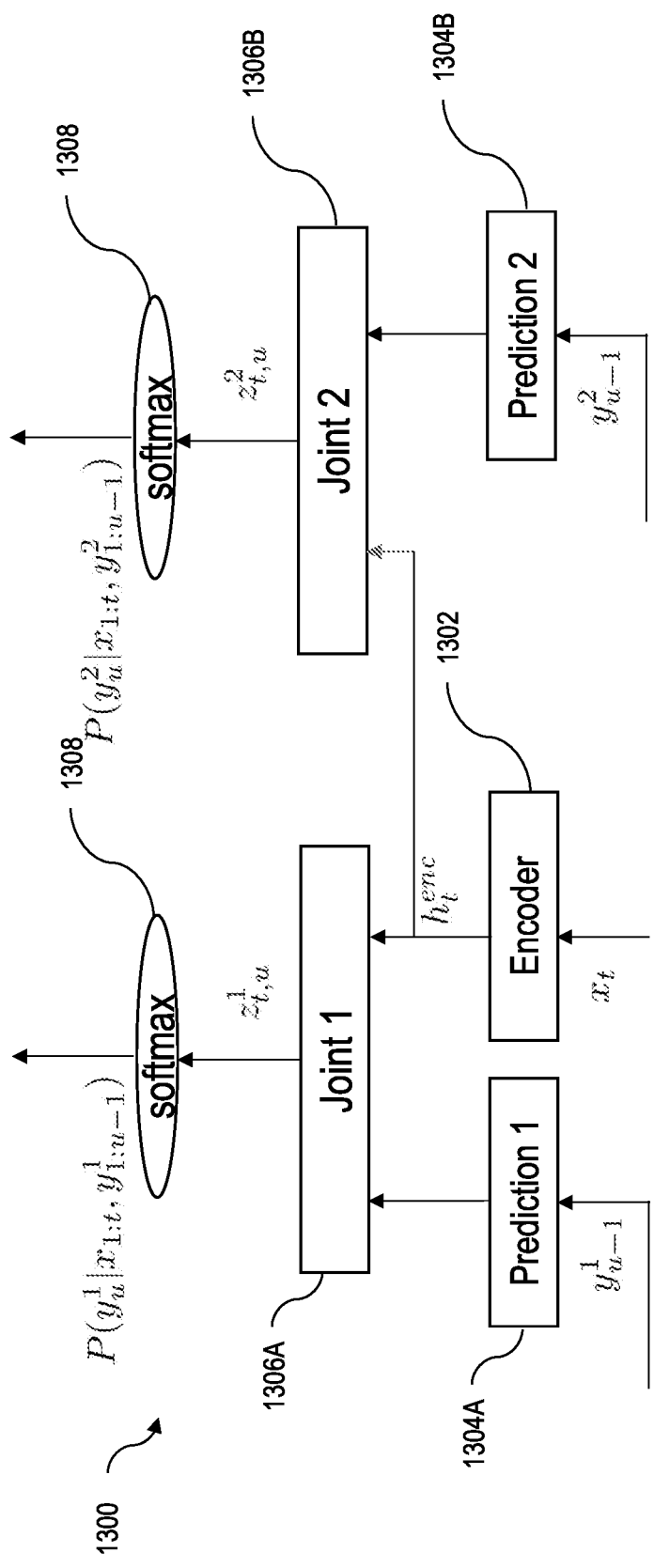
FIG. 13 illustrates an example embodiment of a multilingual end-to-end automatic speech translation model.

Attention will now be directed to FIG. 13, which illustrates an example embodiment of a multi-lingual end-to-end automatic speech translation model 1300. As shown in FIG. 13, the multi-lingual end-to-end automatic speech translation model 1300 shares a single acoustic encoder (e.g., encoder 1302). For example, a particular frame of the input audio (e.g., $x_t$) is received at the acoustic encoder which outputs an acoustic encoder output (e.g., $h_t^{enc}$). The first joint layer is configured to receive output from the first prediction network 1304A (based on the initial prediction network input $y_{u-1}^1$) and the acoustic encoder output. The first joint layer 1306A is then configured to combine those intermediary outputs to generate a joint layer output (e.g., $z_{t,u}^1$). After applying the Softmax layer 1308, a final output label (e.g., $P(y_u^1|x_{1:t}, y_{1:u-1}^1)$) is generated for the frame (e.g., $h_t^{enc}$) in a first target language.

In order to translate the input audio into multiple languages, the second joint layer 1306B is configured to receive the acoustic encoder output (e.g., $h_t^{enc}$) and the second prediction network output (based on the second prediction network input: $y_{u-1}^2$) from the second prediction network 1304B. The second joint layer 1306B is configured to combine both output and generate a second joint layer output (e.g., $z_{t,u}^2$) which is processed using a Softmax layer 1308 to generate a final output label for the frame $x_t$ in a second target language. The second target language is different than the first target language, and different than the source language associated with the input audio.

It should be appreciated that while FIG. 13 shows the multi-lingual end-to-end automatic speech translation model having two prediction layers and two joint layers (i.e., being able to translate input audio into two different languages), the multi-lingual end-to-end automatic speech translation model is configurable to translate into any number of languages (wherein the model includes a prediction network and joint layer for each target language). In some instances, the different joint layers share the same acoustic encoder. Additionally, or alternatively, different sets of components corresponding to a particular set of languages share different acoustic encoders. For example, Latin-based or romantic languages may share a first acoustic encoder, while Germanic languages may share a second acoustic encoder.

Figure 14:
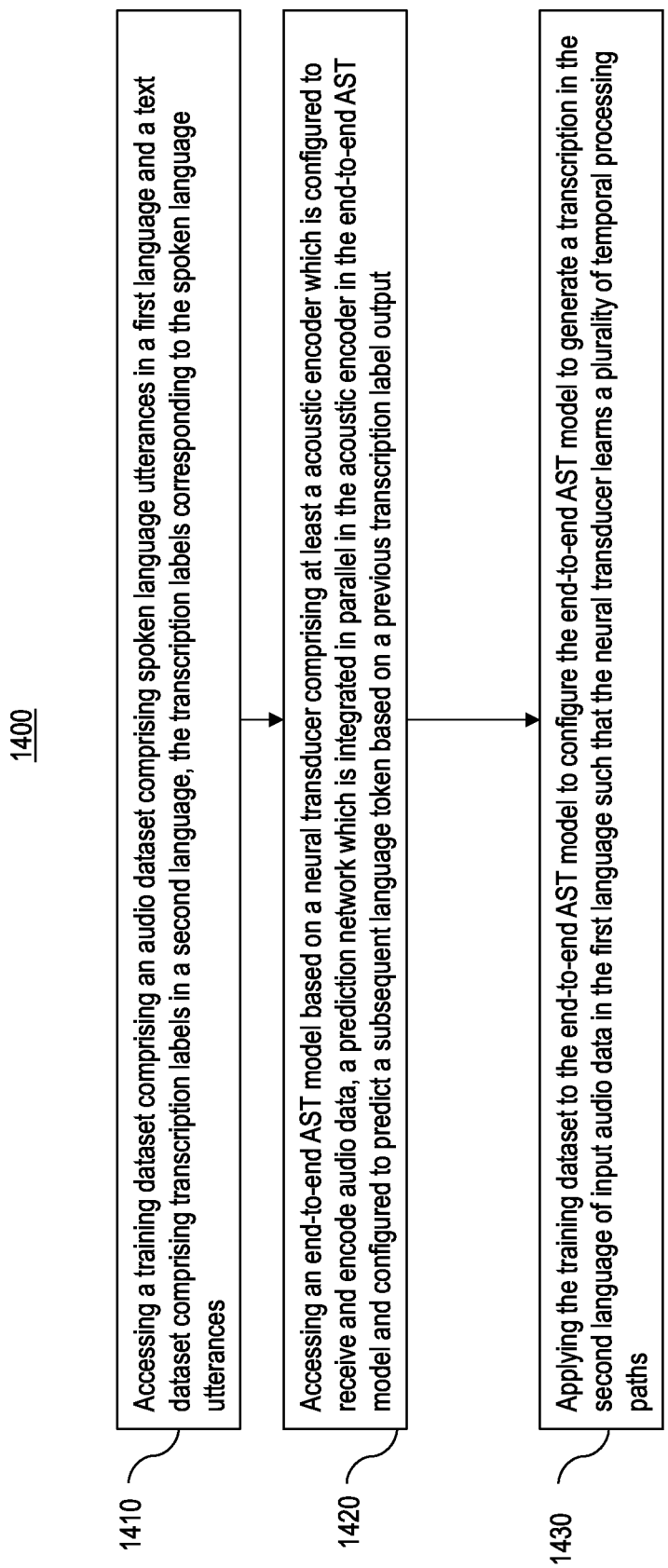
FIG. 14 illustrates an example embodiment of a flow diagram having a plurality of acts for training an end-to-end automatic speech translation model.

Attention will now be directed to FIG. 14, which illustrates an example embodiment of a flow diagram having a plurality of acts for training an end-to-end automatic speech translation model. FIG. 14 illustrates a flow diagram 1400 that includes various acts (act 1410, act 1420, and act 1430) associated with exemplary methods that can be implemented by computing system 110 for training an end-to-end automatic speech translation model.

The first illustrated act includes accessing a training dataset which may include generating a training dataset (act 1410) and/or otherwise obtaining a training dataset from one or more remote systems. The training dataset comprises an audio dataset comprising spoken language utterances in a first language and a text dataset comprising transcription labels in a second language (act 1410). In this manner, the training dataset beneficially comprises augmented or synthesized data, which is clean data that allow for better training. Additionally, augmented data is easier and less time intensive to obtain than natural language audio data or human label transcriptions. In this manner, the new training datasets are easily obtained and easily tunable to new domains for which the model will be trained (including new languages).

The transcription labels included in the text dataset correspond to the spoken language utterances. Systems also obtain an end-to-end AST model comprising at least an acoustic encoder which is configured to receive and encode audio data, a prediction network which is integrated in a parallel model architecture in the acoustic encoder in the end-to-end AST model and configured to predict a subsequent language token based on a previous transcription label output, and optionally, a joint layer which is integrated in series with the acoustic encoder and prediction network (act 1420). The joint layer is configured to combine an acoustic encoder output from the acoustic encoder and a prediction output from the prediction network. Furthermore, the inclusion of an acoustic encoder improves the functioning of the computing system by reducing memory storage needed to store the machine learning module because the acoustic encoder is does not require a decoder or subsequent machine translator to generate the final output in the target language.

Subsequently, the systems apply the training dataset to the end-to-end AST model to configure the end-to-end AST model to generate a transcription in the second language of input audio data in the first language such that the neural transducer learns a plurality of temporal processing paths (act 1430). Because the neural transducer is able to learn a variety of different temporal processing paths, the end-to-end automatic speech translation model is better able to handle translation between different pairs of languages and will be able to translate between a greater number of pairs of languages.

In some embodiments, the end-to-end AST model is further trained in order to optimize the model to select an optimal temporal processing path, optimizing for a particular variable (e.g., accuracy, latency, overall user experience, etc.). For example, in some instances, the method of training includes configuring the end-to-end AST model to select an optimal temporal processing path from the plurality of temporal processing paths based on an amount of word re-ordering required to translate between the first language and the second language. Thus, based on the amount of word-reordering, the system can dynamically select a flexible temporal processing path which will process the input audio data in a manner which optimizes for the particular target variable.

Furthermore, the end-to-end automatic speech translation model, in some instances, comprises pre-trained components. For example, the acoustic encoder is previously trained to receive audio data in a first language and encode the audio data in the first language. Additionally, or alternatively, the prediction network is previously trained to predict the subsequent language token in the first language based on the previous transcription label in the first language. When the acoustic encoder and/or prediction network have been previously trained, in some instances, the components were trained as part of an automatic speech recognition system. In this manner, the AST model is obtainable by at least modifying an automatic speech recognition (ASR) model.

Figure 15:
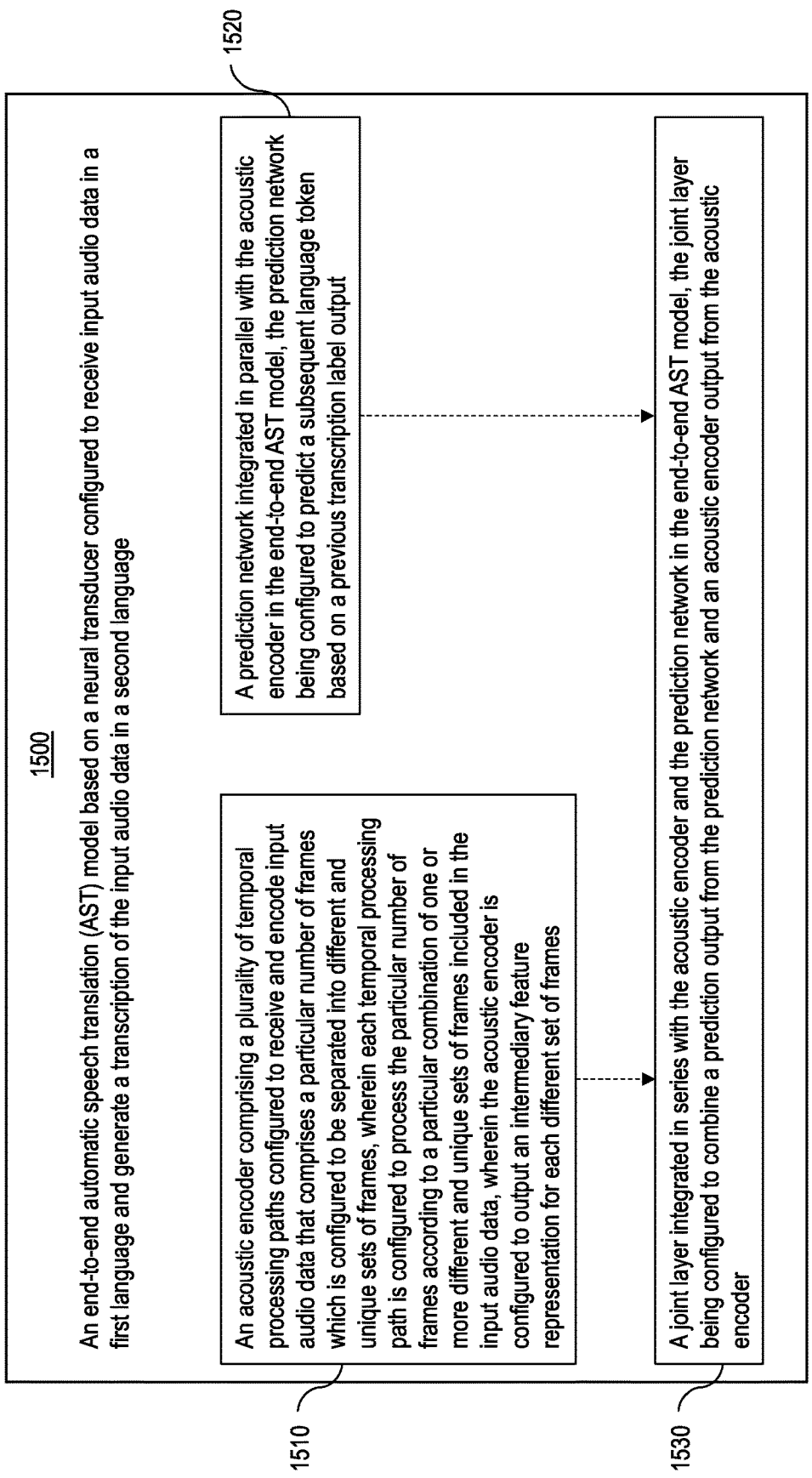
FIG. 15 illustrates an example embodiment of a diagram having a plurality of components for an end-to-end automatic speech translation model.

Attention will now be directed to FIG. 15, which illustrates an example embodiment of a diagram having a plurality of components for an end-to-end automatic speech translation model. FIG. 15 illustrates a diagram 1500 that includes various components (component 1510, component 1520, and component 1530) associated with an example end-to-end automatic speech translation model configured to perform direct speech translation.

As shown in FIG. 15, the end-to-end automatic speech translation model comprises an acoustic encoder (e.g., component 1510) which comprises a plurality of temporal processing paths configured to receive and encode input audio data. The input audio data comprises a particular number of frames which is configured to be separated into different sets of frames. Each temporal processing path is configured to process the particular number of frames according to a particular combination of one or more different sets of frames included in the input audio data. The acoustic encoder is configured to output an intermediary feature representation for each different set of frames. Because the neural transducer is able to learn a variety of different temporal processing paths, the end-to-end automatic speech translation model is better able to handle translation between different pairs of languages and will be able to translate between a greater number of pairs of languages.

The end-to-end automatic speech translation model also comprises a prediction network (e.g., component 1520) integrated in a parallel model architecture with the acoustic encoder in the end-to-end AST model. The prediction network being configured to predict a subsequent language token based on a previous transcription label output.

By compiling the prediction network and the acoustic encoder in a parallel network architecture, the depth of the machine learning model is reduced (as compared to compiling the prediction network and acoustic encoder in a sequential manner). This improves the functioning of the computing system by reducing processing time and inference cost, while achieving an improved output of the machine learning module because the combined output includes information learned from both models.

In some instances, the end-to-end automatic speech translation model also optionally comprises a joint layer (e.g., component 1530) integrated in series with the acoustic encoder and the prediction network in the end-to-end AST model. The joint layer being configured to combine a prediction output from the prediction network and an acoustic encoder output from the acoustic encoder. This beneficially provides a more robust and accurate intermediate output by combining outputs from various components of the model. This in turn improves the accuracy and decreases the latency for generating the final transcription output.

In such instances, the training dataset comprises: an audio dataset comprising spoken language utterances in a first language and a text dataset comprising transcription labels in a second language, the transcription labels corresponding to the spoken language utterances.

Once the end-to-end AST model is obtained, the end-to-end AST model is configured to dynamically select a particular processing path included in the plurality of processing paths based on a particular language pair comprising a source input language and a target output language. Each temporal processing path is associated with a different amount of word reordering required for translation between different pairs of languages. For example, one or more temporal processing paths are associated with a large amount of word-reordering comprise different sets of frames that comprise a large number of frames. Additionally, or alternatively, one or more temporal processing paths are associated with a small amount of word-reordering comprise different sets of frames that comprise a small number of frames.

Figure 16:
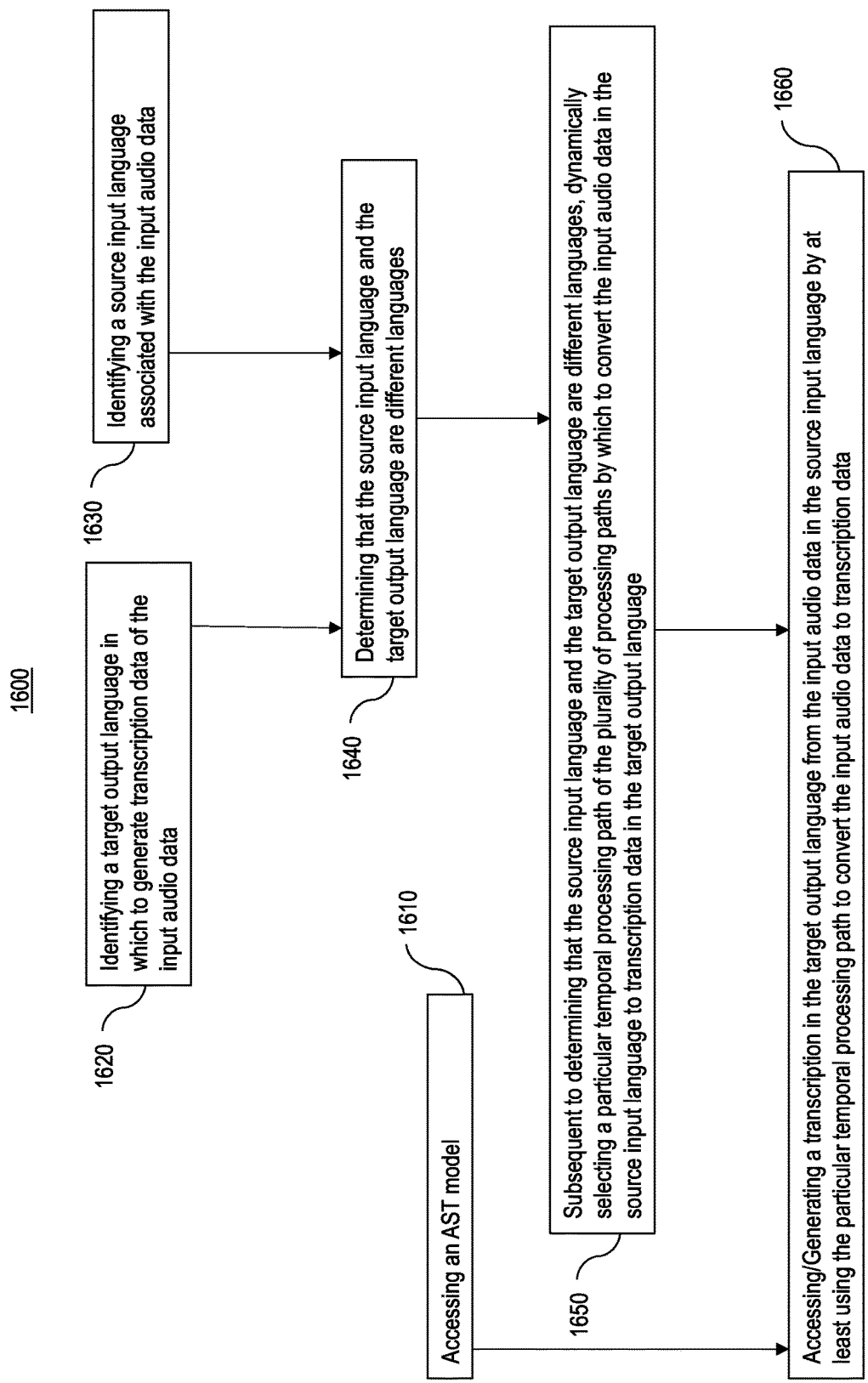
FIG. 16 illustrates an example embodiment of a flow diagram having a plurality of acts for performing direct speech translation using an end-to-end automatic speech translation model.

Attention will now be directed to FIG. 16, which illustrates an example embodiment of a flow diagram 1600 having a plurality of acts for performing direct speech translation using an end-to-end automatic speech translation model. FIG. 16 illustrates a diagram 1600 that includes various acts (act 1610, act 1620, act 1630, act 1640, and act 1650) associated with exemplary methods for performing direct speech translation with an end-to-end automatic speech translation model.

The first illustrated act (act 1610) includes obtaining or otherwise accessing an automatic speech translation model that comprises (i) an acoustic encoder, (ii) a prediction network, and (iii) a joint layer. The acoustic encoder comprises a plurality of temporal processing paths configured to receive and encode input audio data that comprises a particular number of frames which is configured to be separated into different sets of frames. Each temporal processing path is configured to process the particular number of frames according to a particular combination of the different sets of frames included in the input audio data. The acoustic encoder is configured to output an intermediary feature representation for each different set of frames.

The prediction network is integrated in a parallel model architecture with the acoustic encoder in the end-to-end automatic speech translation model. The prediction network is configured to predict a subsequent language token based on a previous transcription label output. The joint layer is integrated in series with the acoustic encoder and the prediction network in the end-to-end automatic speech translation model. The joint layer is configured to combine a prediction output from the prediction network and an acoustic encoder output from the acoustic encoder.

By compiling the prediction network and the acoustic encoder in a parallel network architecture, the depth of the machine learning model is reduced (as compared to compiling the prediction network and acoustic encoder in a sequential manner). This improves the functioning of the computing system by reducing processing time and inference cost, while achieving an improved output of the machine learning module because the combined output includes information learned from both models.

The systems are also configured to identify a target output language in which to generate transcription data of the input audio data (act 1620) and identify a source input language associated with the input audio data (act 1630). Upon determining that the source input language and the target output language are different languages (act 1640), the systems dynamically select a particular temporal processing path of the plurality of processing paths by which to convert the input audio data in the source input language to transcription data in the target output language (act 1650). Subsequently, the systems are configured to generate a transcription in the target output language from the input audio data in the source input language by at least using the particular temporal processing path to convert the input audio data to transcription data (act 1660).

The systems are beneficially configured to select the target output language in different methods. In one example, the target output language is selected based on user input that is received by the system. Additionally, or alternatively, the end-to-end automatic speech translation model is configured to automatically identify the target output language based on a context of the input audio data. For example, if the input audio data is received from a source that is known to be associated with a particular target output language, then the system can identify the source and determine the associated target output language. In another example, if the recipient or user receiving the transcription data output is identified and has a known native language, then the system can automatically select the target language that corresponds to the known native language.

To assist in selecting which temporal processing path should be used to process the input audio data, the end-to-end automatic speech translation model is configured to determine whether the source input language and the target input language are different languages. Then, the model can determine an amount of word reordering that is required for translation between the source input language and the target output language. This is beneficial because if the source input language and the target input language are the same, then no translation is needed (i.e., no word re-ordering) and a very low latency path can be chosen, which improves the user experiences by having a near real-time transcription of the input audio data.

If the source input language and the target output languages are similar languages and little to no word re-ordering is required, then a temporal processing path can be chosen that consumes frame by frame or small sets of frames of the input audio. This improves computer functioning and processing time, while maintaining an accurate transcription. If the source input language and the target output language are very different (i.e., require a large amount of word re-ordering), the system will choose a temporal processing path that consumes sets of frames that include higher numbers of frames (or the entire set of frames includes in the input audio data if needed to maintain high accuracy).

Thus, each temporal processing path is associated with a different amount of word reordering required for translation between different languages, and wherein the particular temporal processing path is dynamically selected based on the amount of word reordering that is required for translation between the source input language and the target output language.

As described above, the end-to-end automatic speech translation model produces various intermediate outputs that are processed by the various components before producing a final label for a particular frame or set of frames. In other words, the end-to-end automatic speech translation model is configured to generate a plurality of intermediary transcription labels for each different set of frames, such that the transcription in the target output language is generated based on the plurality of intermediary transcription labels.

In such configurations, subsequent to generating an intermediary transcription label for a particular different set of frames, the system is configured to apply the intermediary transcription label as input to the prediction network such that a prediction network output based on the intermediary transcription label is combined with an acoustic encoder output based on a new different set of frames that is temporally located subsequent to the particular different set of frames in the input audio data.

Additionally, systems are configured to identify one or more target languages in which to generate transcription data of the input audio data, wherein the end-to-end AST model comprises one or more prediction networks configured to generate a one or more prediction network outputs associated with the one or more target languages that is combinable with the acoustic encoder output. In such configurations, the end-to-end AST model is configured to perform multi-lingual direct speech translation.

Additionally, it should be appreciated that the end-to-end AST model is obtainable by different methods. In some instances, individual components are compiled and then trained. In some instances, individual pre-trained components are compiled.

Example Computing Systems

Embodiments of the present invention may comprise or utilize a special purpose or general-purpose computer (e.g., computing system 110) including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media (e.g., hardware storage device(s) 140 of FIG. 1) that store computer-executable instructions (e.g., computer-readable instructions 118 of FIG. 1) are physical hardware storage media/devices that exclude transmission media. Computer-readable media that carry computer-executable instructions or computer-readable instructions (e.g., computer-readable instructions 118) in one or more carrier waves or signals are transmission media. Thus, by way of example, and not limitation, embodiments of the invention can comprise at least two distinctly different kinds of computer-readable media: physical computer-readable storage media/devices and transmission computer-readable media.

Physical computer-readable storage media/devices are hardware and include RAM, ROM, EEPROM, CD-ROM or other optical disk storage (such as CDs, DVDs, etc.), magnetic disk storage or other magnetic storage devices, or any other hardware which can be used to store desired program code means in the form of computer-executable instructions or data structures and which can be accessed by a general purpose or special purpose computer.

A "network" (e.g., network 130 of FIG. 1) is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry, or desired program code means in the form of computer-executable instructions or data structures, and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for implementing an end-to-end automatic speech translation (AST) model with a neural transducer, the method comprising:
accessing a training dataset comprising an audio dataset comprising spoken language utterances in a first language and a text dataset comprising transcription labels in a second language, the transcription labels corresponding to the spoken language utterances;
accessing an end-to-end AST model based on a neural transducer comprising at least an acoustic encoder which is configured to receive and encode audio data, a prediction network which is integrated in a parallel model architecture with the acoustic encoder in the end-to-end AST model and configured to predict a subsequent language token based on a previous transcription label output;
applying the training dataset to the end-to-end AST model;
generating a transcription in the second language of input audio data in the first language based on the trained end-to-end AST model; and
causing the acoustic encoder to learn a plurality of temporal processing paths.

2. The method of claim 1, further comprising:
configuring the end-to-end AST model to select an optimal temporal processing path from the plurality of temporal processing paths based on an amount of word re-ordering required to translate between the first language and the second language.

3. The method of claim 1, wherein the end-to-end AST model further comprises:
a joint layer which is integrated in series with the acoustic encoder and prediction network, the joint layer being configured to combine an acoustic encoder output from the acoustic encoder with a prediction output from the prediction network.

4. The method of claim 1, wherein the predication network is previously trained to predict the subsequent language token in the first language based on a previous transcription label in a first language.

5. The method of claim 1, wherein the audio dataset included in the training dataset comprises augmented language utterances, such that the transcription labels correspond to the augmented language utterances.

6. A computer system comprising:
one or more processors; and
one or more hardware storage devices that store instructions that are executable by the one or more processors to cause the computer system to execute an end-to-end automatic speech translation (AST) model based on a neural transducer configured to receive input audio data in a first language and to generate a transcription of the input audio data in a second language, wherein the end-to-end AST model comprises:
an acoustic encoder comprising a plurality of temporal processing paths configured to receive and encode input audio data that comprises a particular number of frames which is configured to be separated into different sets of frames, wherein each temporal processing path is configured to process the particular number of frames according to a particular combination of one or more different sets of frames included in the input audio data, wherein the acoustic encoder is configured to output an intermediary transcription label for each different set of frames; and
a prediction network integrated in a parallel model architecture with the acoustic encoder in the end-to-end AST model, the prediction network being configured to predict a subsequent language token based on a previous transcription label output;
wherein the instructions that are stored on the one or more hardware storage devices cause the one or more processors to:
generate the transcription of the input audio data in the second language based on the end-to-end AST model; and
cause the acoustic encoder to use the plurality of temporal processing paths to encode the input audio data.

7. The computer system of claim 6, wherein the end-to-end AST model is trained on a training dataset that comprises: an audio dataset comprising spoken language utterances in a first language and a text dataset comprising transcription labels in a second language, the transcription labels corresponding to the spoken language utterances.

8. The computer system of claim 6, wherein the audio dataset included in the training dataset comprises augmented language utterances, such that the transcription labels correspond to the augmented language utterances.

9. The computer system of claim 6, wherein the end-to-end AST model is configured to dynamically select a particular processing path included in the plurality of temporal processing paths based on a particular language pair comprising a source input language and a target output language.

10. The computer system of claim 6, wherein each temporal processing path is associated with a different amount of word reordering required for translation between different pairs of languages.

11. The computer system of claim 6, further comprising:
one or more additional prediction networks configured to generate one or more additional prediction network outputs associated with the one or more target languages, each additional prediction network output being combinable with the acoustic encoder output.

12. The computer system of claim 6, wherein each different set of frames within the different sets of frames will have a unique combination of frame quantity and/or frame content relative to each other different set of frames within the different sets of frames.

13. A method for performing direct speech translation using an end-to-end automatic speech translation (AST) model based on a neural transducer, the method comprising:
accessing an AST model comprising:
an acoustic encoder comprising a plurality of temporal processing paths configured to receive and encode input audio data that comprises a particular number of frames which is configured to be separated into different sets of frames, wherein each temporal processing path is configured to process the particular number of frames according to a particular combination of the different sets of frames included in the input audio data, wherein the acoustic encoder is configured to output an intermediary feature representation for each different set of frames, a prediction network integrated in a parallel model architecture with the acoustic encoder in the end-to-end AST model, the prediction network being configured to predict a subsequent language token based on a previous transcription label output, and a joint layer integrated in series with the acoustic encoder and the prediction network in the end-to-end AST model, the joint layer being configured to combine a prediction output from the prediction network and an acoustic encoder output from the acoustic encoder;

identifying a target output language in which to generate transcription data of the input audio data;

identifying a source input language associated with the input audio data;

determining that the source input language and the target output language are different languages;

subsequent to determining that the source input language and the target output language are different languages, dynamically selecting a particular temporal processing path of the plurality of temporal processing paths by which to convert the input audio data in the source input language to transcription data in the target output language; and generating a transcription in the target output language from the input audio data in the source input language by at least using the particular temporal processing path to convert the input audio data to transcription data.

14. The method of claim 13, further comprising:
receiving user input configured to select the target output language.

15. The method of claim 13, wherein the AST model is configured to automatically identify the target output language based on a context of the input audio data.

16. The method of claim 13, further comprising:
subsequent to determining that the source input language and the target output language are different languages, determining an amount of word reordering that is required for translation between the source input language and the target output language.

17. The method of claim 16, wherein each temporal processing path is associated with a different amount of word reordering required for translation between different languages, and wherein the particular temporal processing path is dynamically selected based on the amount of word reordering that is required for translation between the source input language and the target output language.

18. The method of claim 13, further comprising:
generating a plurality of intermediary transcription labels for each different set of frames, such that the transcription in the target output language is generated based on the plurality of intermediary transcription labels.

19. The method of claim 18, further comprising:
subsequent to generating an intermediary transcription label for a particular different set of frames, applying the intermediary transcription label as input to the prediction network such that a prediction network output based on the intermediary transcription label is combined with an acoustic encoder output based on a new different set of frames that is temporally located subsequent to the particular different set of frames in the input audio data.

20. The method of claim 19, further comprising:
identifying one or more target languages in which to generate transcription data of the input audio data, wherein the end-to-end AST model comprises one or more additional prediction networks configured to generate one or more additional prediction network outputs associated with the one or more target languages, each additional prediction network output being combinable with the acoustic encoder output.

\* \* \* \* \*